United States Patent
Kusaka

(10) Patent No.: US 9,756,237 B2
(45) Date of Patent: Sep. 5, 2017

(54) FOCUS DETECTION DEVICE AND IMAGE-CAPTURING APPARATUS

(71) Applicant: NIKON CORPORATION, Tokyo (JP)

(72) Inventor: Yosuke Kusaka, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/241,688

(22) Filed: Aug. 19, 2016

(65) Prior Publication Data

US 2016/0360095 A1 Dec. 8, 2016

Related U.S. Application Data

(63) Continuation of application No. 14/432,020, filed as application No. PCT/JP2013/075419 on Sep. 20, 2013, now Pat. No. 9,451,154.

(30) Foreign Application Priority Data

Sep. 28, 2012 (JP) .................................. 2012-217303

(51) Int. Cl.
| | |
|---|---|
| H04N 5/232 | (2006.01) |
| G02B 7/34 | (2006.01) |
| H04N 5/369 | (2011.01) |
| G03B 13/36 | (2006.01) |
| H04N 5/345 | (2011.01) |
| H04N 5/353 | (2011.01) |

(52) U.S. Cl.
CPC ........... *H04N 5/23212* (2013.01); *G02B 7/34* (2013.01); *G03B 13/36* (2013.01); *H04N 5/3452* (2013.01); *H04N 5/353* (2013.01); *H04N 5/3696* (2013.01)

(58) Field of Classification Search
CPC .................................................... H04N 5/3696
See application file for complete search history.

(56) References Cited

U.S. PATENT DOCUMENTS

| | | | |
|---|---|---|---|
| 8,164,642 B2 | 4/2012 | Kusaka | |
| 9,071,748 B2 * | 6/2015 | Theuwissen | ....... H04N 5/23212 |
| 2008/0084483 A1 | 4/2008 | Kusaka | |

(Continued)

FOREIGN PATENT DOCUMENTS

| | | |
|---|---|---|
| CN | 102346288 A | 2/2012 |
| JP | 2007-333720 A | 12/2007 |

(Continued)

OTHER PUBLICATIONS

Dec. 10, 2013 International Search Report issued in International Application No. PCT/JP2013/075419.

(Continued)

*Primary Examiner* — Gary C Vieaux
(74) *Attorney, Agent, or Firm* — Oliff PLC

(57) ABSTRACT

A focus detection device includes: an image sensor that includes a plurality of focus detection pixel rows, each having a plurality of focus detection pixels and each outputting a pair of focus detection signals; a spatial accumulation unit that calculates spatially accumulated values by adding together pairs of focus detection signals output from a first predetermined number of focus detection pixel rows among the plurality of focus detection pixel rows; and a focus detection unit that detects a focusing condition at an optical system based upon the spatially accumulated values.

15 Claims, 17 Drawing Sheets

(56) References Cited

U.S. PATENT DOCUMENTS

| | | | |
|---|---|---|---|
| 2008/0112643 A1 | 5/2008 | Kusaka | |
| 2008/0309771 A1 | 12/2008 | Takahashi | |
| 2009/0096886 A1 | 4/2009 | Kusaka | |
| 2009/0174807 A1 | 7/2009 | Utagawa | |
| 2011/0279727 A1 | 11/2011 | Kusaka | |
| 2012/0026386 A1 | 2/2012 | Tomita | |
| 2012/0033128 A1 | 2/2012 | Nagano | |
| 2012/0262604 A1* | 10/2012 | Ishii | H04N 5/23212 348/231.99 |
| 2013/0194471 A1* | 8/2013 | Yamashita | H04N 5/374 348/308 |

FOREIGN PATENT DOCUMENTS

| | | | |
|---|---|---|---|
| JP | 2008-085738 A | | 4/2008 |
| JP | 2008103885 A | * | 5/2008 |
| JP | 2008-309883 A | | 12/2008 |
| JP | 2009-128579 A | | 6/2009 |
| JP | 2010-117679 A | | 5/2010 |
| JP | 2010-152161 A | | 7/2010 |
| JP | 2010-271419 A | | 12/2010 |
| JP | 2011-252955 A | | 12/2011 |
| JP | 2012-113189 A | | 6/2012 |

OTHER PUBLICATIONS

Mar. 3, 2015 Office Action issued in Japanese Application No. 2011-104687.
May 31, 2016 Search Report issued in European Patent Application No. 13841231.7.
Jun. 28, 2016 Office Action issued in Chinese Patent Application No. 201380051161.7.
Sep. 30, 2015 Office Action issued in U.S. Appl. No. 14/432,020.
Jan. 10, 2017 Office Action issued in Japanese Patent Application No. 2016-105305.

* cited by examiner

FOCUS DETECTION DEVICE AND IMAGE-CAPTURING APPARATUS

CROSS-REFERENCE TO RELATED APPLICATIONS

This is a Continuation of application Ser. No. 14/432,020 filed Mar. 27, 2015, which in turn is a National Phase of International Application No. PCT/JP2013/075419 filed Sep. 20, 2013, which claims the benefit of Japanese Application No. 2012-217303 filed Sep. 28, 2012. The disclosure of the prior applications is hereby incorporated by reference herein in its entirety.

TECHNICAL FIELD

The present invention relates to a focus detection device and an image-capturing apparatus.

BACKGROUND ART

Focus detection pixels, each comprising a micro-lens and a pair of photoelectric conversion units disposed to the rear of the micro-lens, are arrayed on a predetermined focal plane of a photographic lens. Via this array, a pair of image signals corresponding to a pair of images formed with a pair of focus detection light fluxes passing through an optical system are generated. The focusing condition (a defocus amount indicating the extent of defocus) at the photographic lens is determined by detecting an image shift amount (phase difference), i.e., the extent of image shift manifested by the pair of image signals. A focus detection device engaged in such an operation is known in the related art as a focus detection device adopting the split-pupil phase detection method.

Focus detection is executed concurrently as a live view image display is provided by reading out focus detection pixel signals and image-capturing pixel signals over predetermined specific frame time intervals from an image-capturing element (image sensor) configured with focus detection pixels such as those described above and image-capturing pixels disposed thereat in combination. In addition, the signals from the focus detection pixels output in correspondence to a plurality of previous frames are stored frame by frame. If the signals from the focus detection pixels for the most recent frame fail to achieve a sufficient output level and thus the focusing condition cannot be detected in conjunction with these signals alone, the focus detection pixel signals stored over the plurality of past frames are added together for temporal accumulation. There is a focus detection device known in the related art (see patent literature 1) that executes focus detection based upon focus detection pixel signals with the output level thereof raised through such measures.

CITATION LIST

Patent Literature

PTL1: Japanese Laid Open Patent Publication No. 2008-85738

SUMMARY OF INVENTION

Technical Problem

There is an issue that needs to be addressed in the focus detection device described above in that an error may occur in the focus detection results obtained in relation to a moving subject.

Solution to Problem

A focus detection device according to a first aspect of the present invention comprises: an image sensor that includes a plurality of focus detection pixel rows, each having a plurality of focus detection pixels and each outputting a pair of focus detection signals; a spatial accumulation unit that calculates spatially accumulated values by adding together pairs of focus detection signals output from a first predetermined number of focus detection pixel rows among the plurality of focus detection pixel rows; and a focus detection unit that detects a focusing condition at an optical system based upon the spatially accumulated values.

According to a second aspect of the present invention, in the focus detection device according to the first aspect, it is preferable to further comprise: a temporal accumulation unit that calculates temporally accumulated values based upon the spatially accumulated values. The first predetermined number of focus detection pixel rows each repeatedly output the pair of focus detection signals over a predetermined time interval; each time the first predetermined number of focus detection pixel rows each output the pair of focus detection signals after the predetermined time interval, the spatial accumulation unit calculates the spatially accumulated values by adding up the pairs of focus detection signals output from the first predetermined number of focus detection pixel rows; the temporal accumulation unit calculates the temporally accumulated values by adding up a second predetermined number of spatially accumulated values obtained as the spatial accumulation unit repeatedly calculates the spatially accumulated values; and the focus detection unit detects the focusing condition based upon one of the spatially accumulated values and the temporally accumulated values calculated based upon the spatially accumulated values.

According to a third aspect of the present invention, in the focus detection device according to the second aspect, it is preferable that the first predetermined number of focus detection pixel rows are each formed with the plurality of focus detection pixels disposed along the predetermined direction, and each repeatedly output the pair of focus detection signals corresponding to a pair of images formed with a pair of focus detection light fluxes, generated through photoelectric conversion, over the predetermined time interval.

According to a fourth aspect of the present invention, in the focus detection device according to the third aspect, it is preferable that the first predetermined number and the second predetermined number are determined so that an evaluation value calculated based upon the pairs of focus detection signals exceeds a predetermined threshold value when the focus detection unit detects the focusing condition based upon the temporally accumulated values.

According to a fifth aspect of the present invention, in the focus detection device according to the fourth aspect, it is preferable that when the focus detection unit detects the focusing condition based upon the spatially accumulated values, the evaluation value is a first cumulative value determined based upon the spatially accumulated values, with the first predetermined number set within a range under a maximum number and the second predetermined number set to 0 so that the first cumulative value exceeds the predetermined threshold value, whereas when the focus detection unit detects the focusing condition based upon the temporally accumulated values, the evaluation value is a second cumulative value determined based upon the temporally accumulated values, with the first predetermined number set to the maximum number and the second predetermined number set so that the second cumulative value exceeds the predetermined threshold value.

According to a sixth aspect of the present invention, in the focus detection device according to the fifth aspect, it is preferable to further comprise: a storage device in which the pair of focus detection signals is stored each time the first predetermined number of focus detection pixel rows each output the pair of focus detection signals after the predetermined time interval. The spatial accumulation unit calculates the spatially accumulated values by adding up the pairs of focus detection signals stored in the storage device.

According to a seventh aspect of the present invention, in the focus detection device according to the fifth aspect, it is preferable to further comprise: a storage device in which the spatially accumulated values calculated by the spatial accumulation unit are stored each time the first predetermined number of focus detection pixel rows each output the pair of focus detection signals after the predetermined time interval. The temporal accumulation unit calculates the temporally accumulated values by adding up the second predetermined number of spatially accumulated values stored in the storage device.

According to an eighth aspect of the present invention, in the focus detection device according to the fifth aspect, it is preferable to further comprise: a storage device in which the temporally accumulated values calculated by the temporal accumulation unit are stored each time the first predetermined number of focus detection pixel rows each output the pair of focus detection signals after the predetermined time interval. When detecting the focusing condition based upon the temporally accumulated values, the focus detection unit detects the focusing condition based upon that temporally accumulated values stored in the storage device.

According to a ninth aspect of the present invention, in the focus detection device according to the fourth aspect, it is preferable to further comprise: a movement detection unit that detects an extent of movement occurring in the pair of images during the predetermined time interval. When the focus detection unit detects the focusing condition based upon the temporally accumulated values, the first predetermined number and the second predetermined number are determined so that a value taken for the second predetermined number becomes smaller relative to a value taken for the first predetermined number as the extent of movement increases and that a product of the first predetermined number and the second predetermined number is substantially equal to a constant value corresponding to the evaluation value and the predetermined threshold value.

According to a tenth aspect of the present invention, in the focus detection device according to any one of the fifth to eighth aspects, it is preferable that the first cumulative value and the second cumulative value correspond to an average value of the spatially accumulated values and an average value of the temporally accumulated values, a largest value of the spatially accumulated values and a largest value of the temporally accumulated values, or a difference between the largest value and the smallest value of the spatially accumulated values and a difference between the largest value and the smallest value of the temporally accumulated values.

According to an eleventh aspect of the present invention, in the focus detection device according to the ninth aspect, it is preferable that the evaluation value corresponds to one of an average value of values indicated by the pairs of focus detection signals, a largest value indicated by the pairs of focus detection signals and a difference between the largest value and a smallest value indicated by the pairs of focus detection signals.

According to a twelfth aspect of the present invention, in the focus detection device according to any one of the third to eleventh aspects, it is preferable that the plurality of focus detection pixels each include a micro-lens through which the pair of focus detection light fluxes pass and a pair of photoelectric conversion units set side-by-side along the predetermined direction, where the pair of focus detection light fluxes received thereat undergo photoelectric conversion; and via the micro-lens, the pair of photoelectric conversion units and a pair of areas through which the pair of focus detection light fluxes pass, set side-by-side along a direction parallel to the predetermined direction as part of an exit pupil of the optical system, achieve a conjugate relation to each other.

According to a thirteenth aspect of the present invention, in the focus detection device according to the twelfth aspect, it is preferable that a plurality of image-capturing pixels that output, over a predetermined time interval, subject image signals corresponding to a subject image generated through photoelectric conversion of a photographic light flux, having originated from a subject, passed through the optical system and received thereat, are disposed at the image sensor in combination with the plurality of focus detection pixels.

According to a fourteenth aspect of the present invention, in the focus detection device according to the third aspect, it is preferable that the plurality of focus detection pixels forming the first predetermined number of focus detection pixel rows each receive the pair of focus detection light fluxes having passed through a pair of areas that are part of an exit pupil of the optical system and are set side-by-side along a direction parallel to the predetermined direction; and the plurality of focus detection pixel rows are disposed so as to extend parallel to one another.

An image-capturing apparatus according to a fifteenth aspect of the present invention comprises: a focus detection device according to any one of the first to fourteenth aspects; a drive unit that drives the optical system to a focus match position based upon the focusing condition detected by the focus detection unit; and an acquisition unit that obtains image data based upon a photographic light flux having originated from a subject and passed through the optical system when the optical system is set at the focus much position.

Advantageous Effects of Invention

The focus detection device according to the present invention is capable of highly accurate focus detection.

DESCRIPTION OF EMBODIMENTS (First Embodiment)

Figure 1:
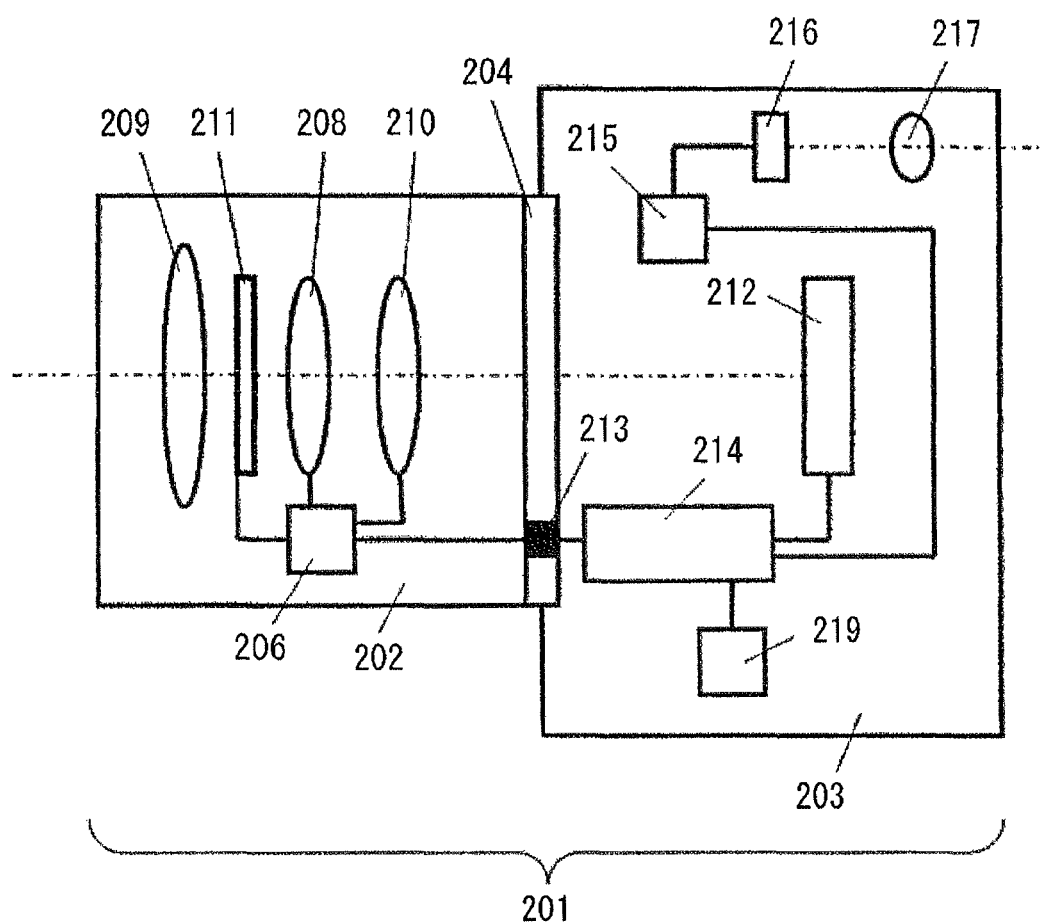
FIG. 1 A lateral sectional view showing the structure of a digital still camera

FIG. 1 is a lateral sectional view illustrating the structure of a digital still camera 201 with an interchangeable lens, representing an example of an image-capturing apparatus equipped with a focus detection device achieved in the first embodiment of the present invention. The digital still camera 201 comprises an interchangeable lens 202 and a camera body 203. The interchangeable lens 202, i.e., one of various interchangeable lenses, is mounted at the camera body 203 via a mount unit 204.

The interchangeable lens 202 includes a lens 209, a zooming lens 208, a focusing lens 210, an aperture 211 and a lens drive control device 206. The lens drive control device 206 is constituted with a microcomputer, a memory, a drive control circuit and the like (none shown). The lens drive control device 206 executes drive control for focus adjustment at the focusing lens 210 and for opening diameter adjustment at the aperture 211 and detects the states of the zooming lens 208, the focusing lens 210 and the aperture 211. In addition, the lens drive control device 206 engages in communication with a body drive control device 214 to be detailed later to transmit lens information to the body drive control device 214 and receive camera information from the body drive control device 214. The aperture 211 forms an opening, the diameter of which can be adjusted, centered on the optical axis for purposes of light amount adjustment and adjustment of the extent of blurring.

An image-capturing element (image sensor) 212, the body drive control device 214, a liquid crystal display element drive circuit 215, a liquid crystal display element 216, an eyepiece lens 217, a memory card 219 and the like are disposed at the camera body 203. A plurality of image-capturing pixels are two-dimensionally arrayed at the image-capturing element 212 and a plurality of focus detection pixels are also built into the image-capturing element over an area corresponding to a focus detection position. The image-capturing element 212 will be described in detail later.

The body drive control device 214 includes a microcomputer, a memory, a drive control circuit and the like. The body drive control device 214 is engaged in repeated execution of drive control for the image-capturing element 212, read of image signals and focus detection signals, focus detection operation based upon focus detection signals and focus adjustment for the interchangeable lens 202, and also processes and records the image signals, controls camera operations and the like. The body drive control device 214 also engages in communication with the lens drive control device 206 via an electrical contact point 213 to receive the lens information and transmit the camera information (indicating a defocus amount, an aperture number and the like).

The liquid crystal display element 216 functions as an electronic viewfinder (EVF). A live view image is brought up on display at the liquid crystal display element 216 by the liquid crystal display element drive circuit 215 based upon image signals provided via the image-capturing element 212. The live view image can be observed by the photographer via the eyepiece lens 217. The memory card 219 is an image storage medium in which image data generated based upon image signals obtained by capturing an image at the image-capturing element 212 are stored.

A subject image is formed on the light-receiving surface of the image-capturing element 212 with a light flux having passed through the interchangeable lens 202. The subject image undergoes photoelectric conversion at the image-capturing element 212 and subsequently, image signals and focus detection signals are transmitted to the body drive control device 214.

The body drive control device 214 calculates the defocus amount indicating the extent of defocus based upon focus detection signals output from focus detection pixels at the image-capturing element 212 and transmits this defocus amount to the lens drive control device 206. In addition, the body drive control device 214 generates image data by processing the image signals provided from the image-capturing element 212 and stores the image data thus generated into the memory card 219. It also provides live view image signals from the image-capturing element 212 to the liquid crystal display element drive circuit 215 so as to bring up a live view image on display at the liquid crystal display element 216. Moreover, the body drive control device 214 provides aperture control information to the lens drive control device 206 to enable control of the opening at the aperture 211.

The lens drive control device 206 updates the lens information in correspondence to the current focusing state, zooming state and aperture setting state, the maximum aperture number and the like. More specifically, the lens drive control device 206 detects the positions of the zooming lens 208 and the focusing lens 210 and the aperture number set for the aperture 211, and calculates lens information based upon the lens positions and the aperture number. Alternatively, it may select the lens information corresponding to the lens positions and the aperture number from a lookup table prepared in advance.

The lens drive control device 206 calculates a lens drive quantity indicating the extent to which the lens is to be driven based upon the defocus amount received thereat and drives the focusing lens 210 to a focus match position based upon the lens drive quantity. The lens drive control device 206 also drives the aperture 211 in correspondence to the aperture number it has received.

Figure 2:
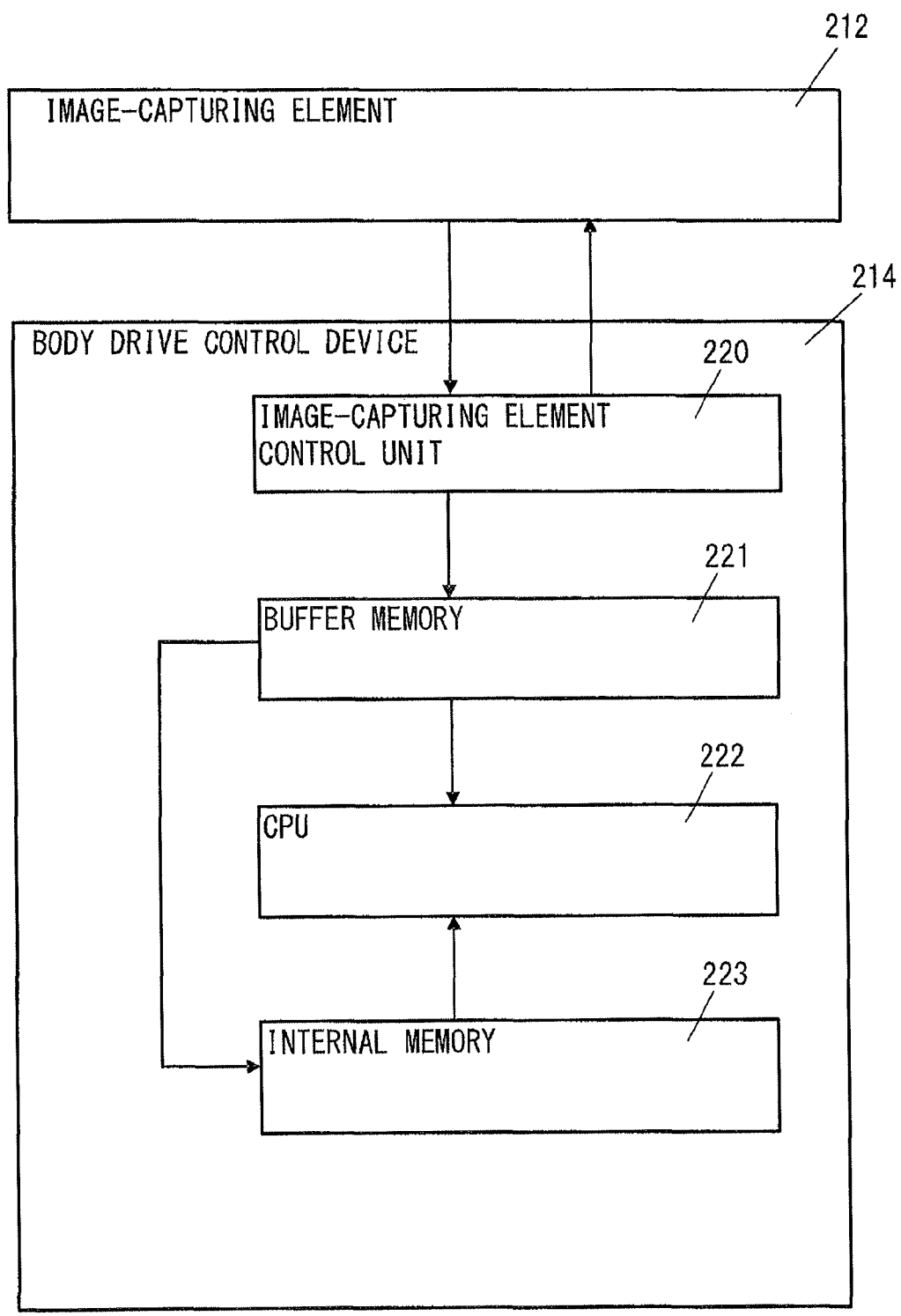
FIG. 2 A block diagram indicating in detail the relationship between an image-capturing element and a body drive control device FIG. 3 An illustration indicating a focus detection position set on the photographic image plane FIG. 4 A front view showing the structure of an image-capturing element in detail FIG. 5 A front view showing the structure of the image-capturing element in detail FIG. 6 An illustration of the structure of a focus detection optical system engaged in focus detection through the split-pupil phase detection method enabled via micro-lenses FIG. 7 An illustration showing how a photographic light flux is received at image-capturing pixels FIG. 8 A flowchart of an image-capturing operation that includes the focus detection operation executed as a part thereof in the digital still camera FIG. 9 A flowchart of the processing executed to generate focus detection data FIG. 10 A diagram illustrating how the spatial accumulation processing is executed FIG. 11 A diagram illustrating how the temporal accumulation processing is executed FIG. 12 A timing chart pertaining to the processing operation executed for focus detection data generation FIG. 13 A flowchart of processing that may be executed to generate focus detection data FIG. 14 A diagram illustrating how temporal accumulation processing may be executed FIG. 15 A flowchart of processing that may be executed to generate focus detection data FIG. 16 A graph in reference to which the processing executed to determine the number of spatial accumulation operations to be executed and the number of temporal accumulation operations to be executed will be explained in detail FIG. 17 A front view showing the structure of an image-capturing element in detail

FIG. 2 is a block diagram illustrating in detail the aspect of the relationship between the image-capturing element 212 and the body drive control device 214 that pertains to the present invention. As FIG. 2 indicates, an image-capturing element control unit 220, a buffer memory 221, a CPU (microcomputer) 222 and an internal memory 223 are installed in the body drive control device 214. Under control executed by the image-capturing element control unit 220, the image-capturing element 212 controls charge storage (the charge storage duration and the timing of charge storage) at the image-capturing pixels and the focus detection pixels and also controls output of the image signals and the focus detection signals. The image signals corresponding to a subject image and the focus detection signals corresponding to a pair of images, as will be explained later, read out from the image-capturing element 212 by the image-capturing element control unit 212 first undergo preliminary processing such as signal amplification and A/D conversion and are then temporarily stored as data for a single frame into the buffer memory 221. The CPU 222 executes image processing of the known art on the image signals included in the single-frame data stored in the buffer memory 221 so as to provide an image display and record the image. The CPU 222 also executes focus detection processing, as will be explained later, based upon the focus detection signals included in the single-frame data stored in the buffer memory 221. The internal memory 223 is used to store focus detection signals for a plurality of past frames. The CPU 222 executing the focus detection processing references the focus detection signals corresponding to the past frames stored in the internal memory 223. Once the focus detection processing executed in conjunction with the focus detection signals for the most recent frame is completed, the focus detection signals in the most recent frame data, temporally stored in the buffer memory 221, are transferred into the internal memory 223. The internal memory 223 assumes an FILO (first in last out) stacked structure, whereby the recorded contents in the internal memory 223 are sequentially updated so that the focus detection signals corresponding to a predetermined number of immediate past frames are held therein.

Figure 3:
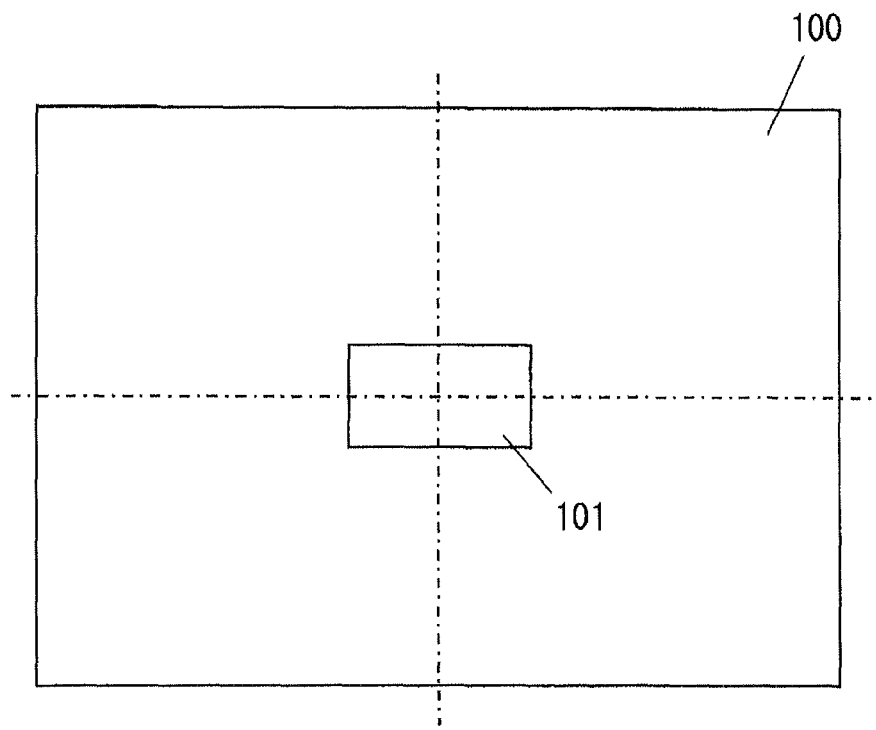

FIG. 3 shows a focus detection area set on the photographic image plane, which represents an example of an area (a focus detection area, a focus detection position) where an image is sampled on the photographic image plane when focus detection is executed via a focus detection pixel group at the image-capturing element 212, as will be detailed later. A focus detection area 101 in this example is set at the center of a rectangular photographic image plane 100. Focus detection pixels are disposed in correspondence to the rectangular focus detection area 101.

Figure 4:
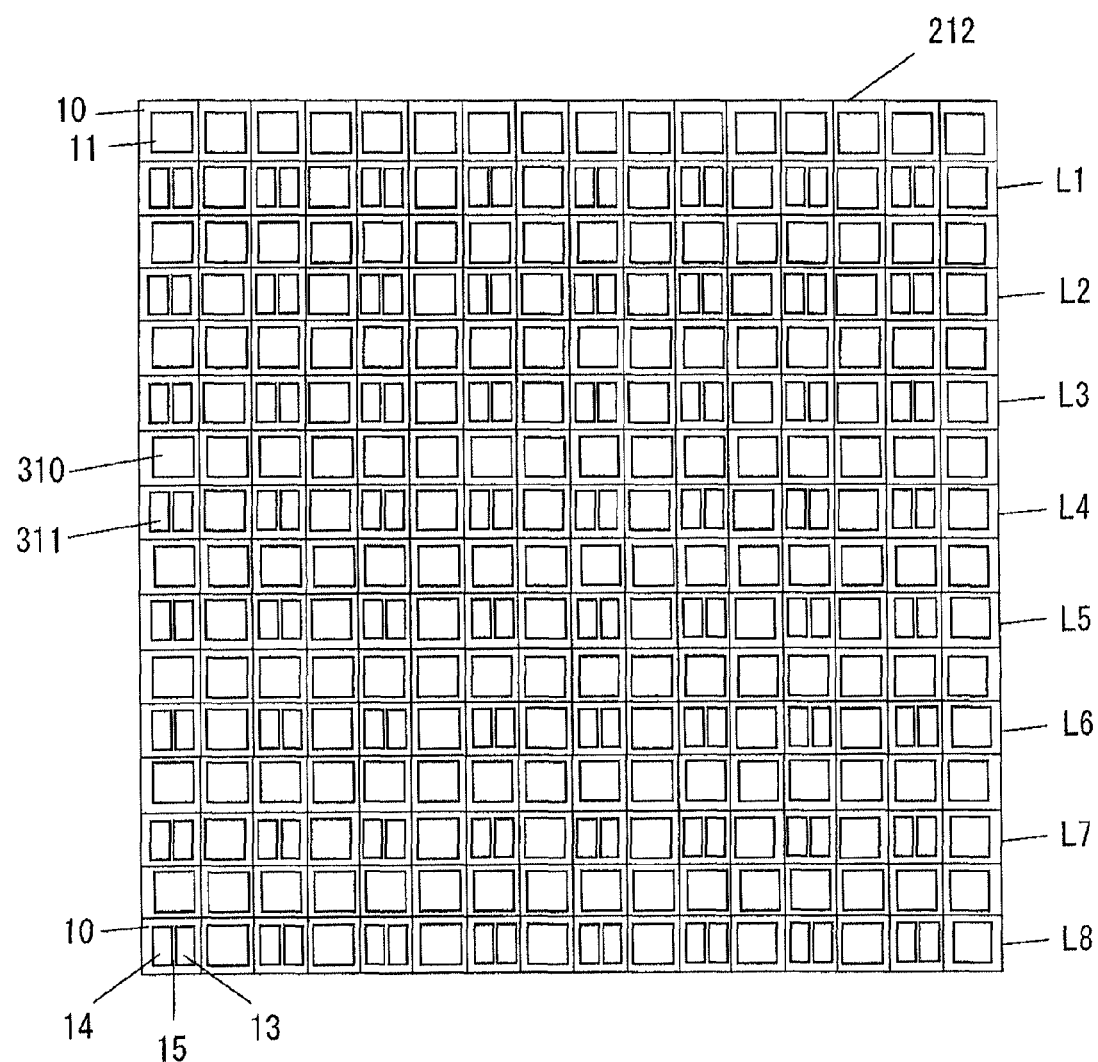
Figure 5:
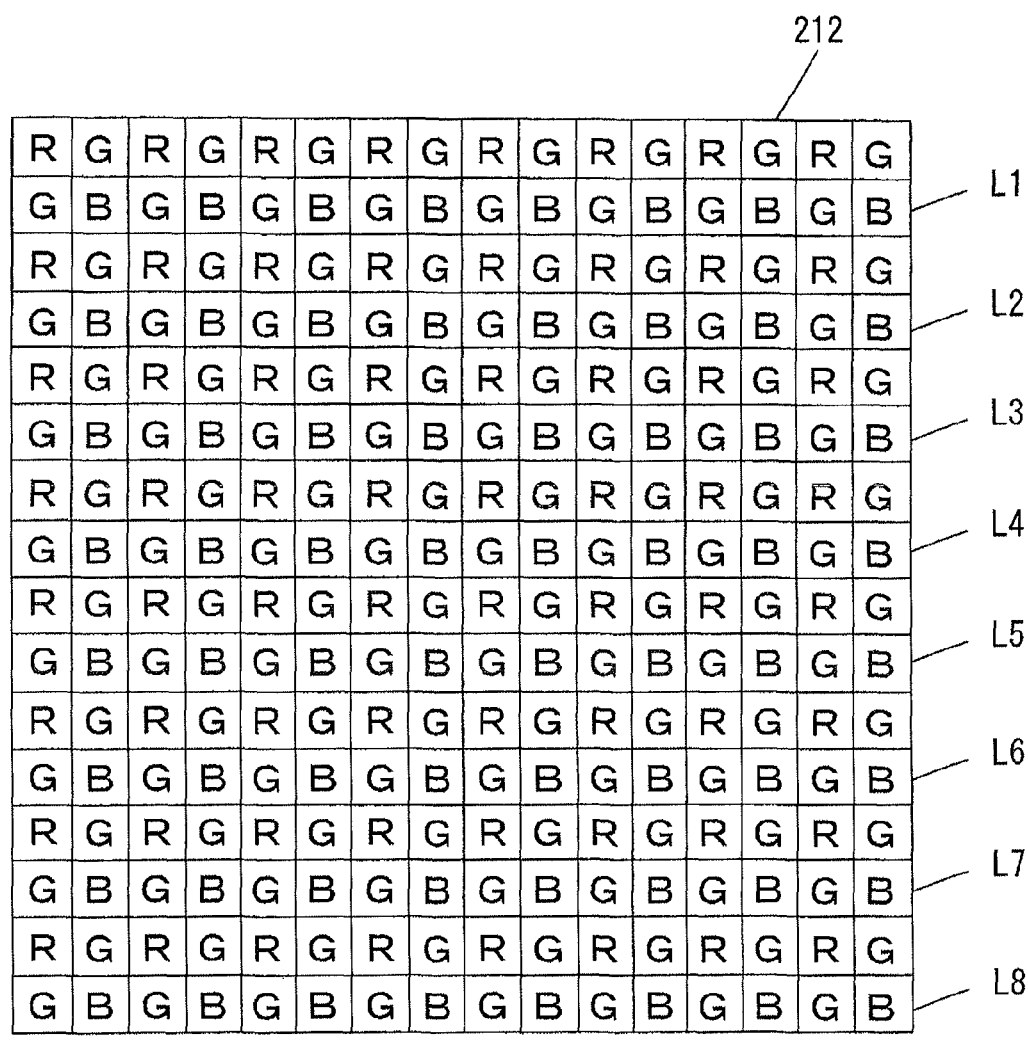

FIG. 4 and FIG. 5 each show in detail the structure of the image-capturing element 212 in an enlarged front view of the focus detection area 101 at the image-capturing element 212. FIG. 4 shows how image-capturing pixels 310 and focus detection pixels 311 are laid out. As FIG. 4 indicates, the image capturing pixels 310 and the focus detection pixels 311 are arrayed together in a dense two-dimensional square grid pattern at the image-capturing element 212. Focus detection pixels 311 are disposed at every other position in each of a plurality of pixel rows extending along the horizontal direction, thereby forming focus detection pixel rows L1 through L8. FIG. 5 shows the color filter array pattern with which color filters are disposed at the image-capturing pixels 310 and the focus detection pixels 311 in FIG. 4. Color filters, i.e., red color filters R, green color filters G and blue color filters B, are disposed at the image-capturing pixels 310 and the focus detection pixels 311 in conformance to the Bayer array rules. The red color filters R, the green color filters G and the blue color filters B demonstrate high levels of spectral sensitivity over wavelength ranges different from one another. The green color filters G are disposed at the focus detection pixels 311. A phase difference manifesting along the horizontal direction is detected based upon data (focus detection signals) originating from the plurality of focus detection pixels 311 disposed in the focus detection pixel rows L1 through L8 extending along the horizontal direction. The data from the plurality of focus detection pixels 311 disposed in the focus detection pixel row L1 are normally used for focus detection. Under certain circumstances, the data from the plurality of focus detection pixels 311 disposed in a focus detection pixel row among the focus detection pixel rows L2 through L8 are added to the data from the corresponding focus detection pixels 311 disposed in the focus detection pixel row L1 and the resulting cumulative values are used in the focus detection. Such an accumulation operation, through which data from focus detection pixels 311 taking up spatial positions different from each other are added up, will be hereafter referred to as "spatial accumulation".

The image-capturing pixels 310 each comprise a rectangular micro-lens 10 and a photoelectric conversion unit 11 with a light receiving area thereof restricted by a light-shielding mask (not shown). The focus detection pixels 311 each comprise a rectangular micro-lens 10 and a pair of photoelectric conversion units 13 and 14 formed by splitting the photoelectric conversion unit 11 of an image-capturing pixel 310 into two parts via an element separation area 15 ranging along the vertical direction. It is to be noted that in order to simplify the illustration, FIG. 4 does not show any color filters.

The image-capturing pixels 310 are designed so that their shape allows a light flux passing through the exit pupil of the fastest interchangeable lens (e.g., f 1.0) to be received in its entirety at the photoelectric conversion units 11 via the micro-lenses 10. In addition, the focus detection pixels 311 are designed so that their shape allows a pair of focus detection light fluxes passing through a pair of areas, set side-by-side along a direction parallel to the direction in which the pair of photoelectric conversion units 13 and 14 are set side-by-side, at the exit pupil of the interchangeable lens 202 to be respectively received at the photoelectric conversion units 13 and 14 via the micro-lenses 10.

Figure 6:
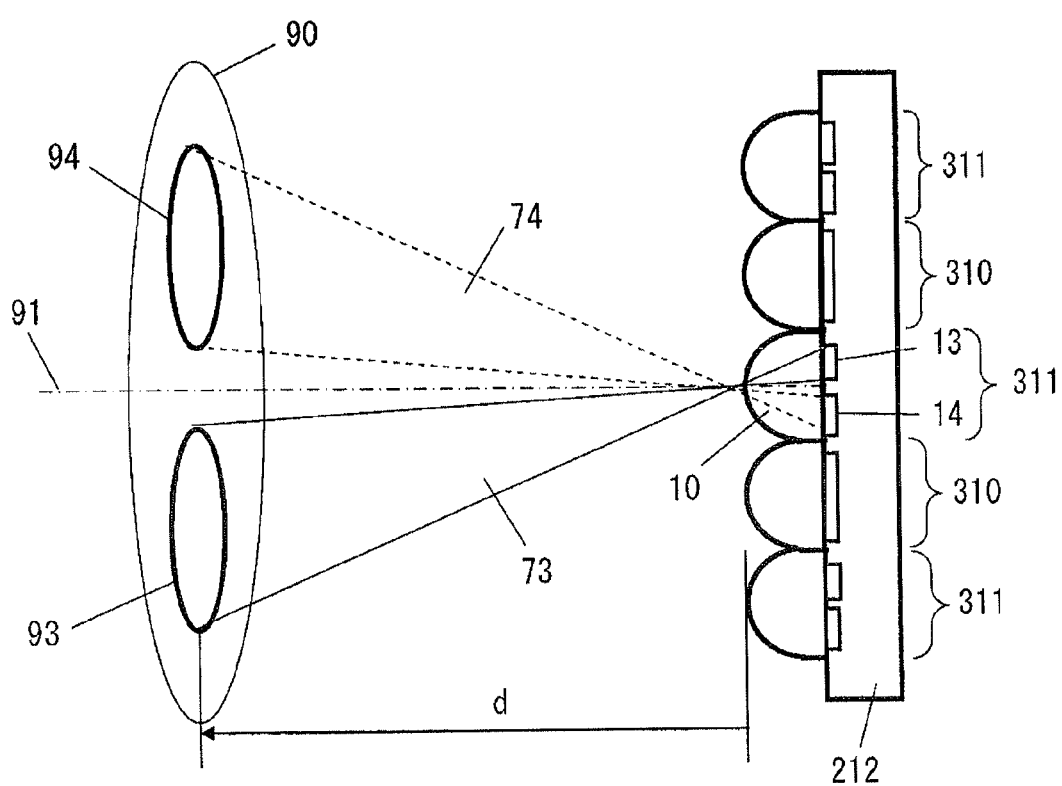

FIG. 6 shows the structure of a focus detection optical system used to detect the focusing condition via micro-lenses 10 through the split-pupil phase detection method. FIG. 6 provides an enlarged schematic illustration of three focus detection pixels 311 and two image-capturing pixels 310, taking up successive positions near a photographic optical axis 91 in the focus detection pixel row L1 extending along the horizontal direction in the focus detection area 101. An exit pupil 90 in FIG. 6 is set over a distance d along the frontward direction from the micro-lenses 10 disposed at the predetermined image-forming plane of the interchangeable lens 202 (see FIG. 1). The distance d is determined in correspondence to the curvature of the micro-lenses 10, the refractive index of the micro-lenses 10, the distance between the micro-lenses 10 and the photoelectric conversion units 13 and 14 and the like, and is referred to as a focus detection pupil distance in this description. FIG. 6 also shows the optical axis 91 of the interchangeable lens, micro-lenses 10, photoelectric conversion units 13 and 14, focus detection pixels 311, image-capturing pixels 310 and focus detection light fluxes 73 and 74.

A focus detection pupil 93 is formed as a photoelectric conversion unit 13, with the light receiving area thereof defined by an opening in the light shielding mask, is projected via the micro-lens 10. Likewise, a focus detection pupil 94 is formed as a photoelectric conversion unit 14, with the light receiving area thereof defined by an opening in the light shielding mask, is projected via the micro-lens 10. The pair of focus detection pupils 93 and 94 assume shapes achieving line symmetry relative to a vertical line passing through the optical axis 91. The pair of focus detection pupils 93 and 94 correspond to the pair of areas mentioned earlier. Via the micro-lens 10, the pair of photoelectric conversion units 13 and 14 and the pair of areas mentioned earlier, i.e., the pair of focus detection pupils 93 and 94, achieve a conjugate relation to each other.

The pair of photoelectric conversion units 13 and 14 in each of the focus detection pixels 311 disposed in the focus detection pixel rows L1 through L8 extending along the horizontal direction in the focus detection area 101 are set side-by-side along the horizontal direction, as are the focus detection pixels forming the focus detection pixel rows. The pair of photoelectric conversion units 13 and 14 respectively receive the pair of focus detection light fluxes 73 and 74 arriving at the corresponding micro-lens from the pair of focus detection pupils 93 and 94 set side-by-side along the direction matching the direction in which the photoelectric conversion units 13 and 14 are set next to each other. As the pairs of photoelectric conversion units 13 and 14 in the plurality of focus detection pixels 311 forming each focus detection pixel row receive the pair of focus detection light fluxes 73 and 74, a pair of image signals generated through photoelectric conversion, which correspond to a pair of images formed with the pair of focus detection light fluxes 73 and 74, are repeatedly output over predetermined frame intervals.

The photoelectric conversion unit 13 in a focus detection pixel 311 structured as described above outputs a signal corresponding to the intensity of an image formed on the micro-lens 10 of the focus detection pixel 311 with the focus detection light flux 73 having passed through the focus detection pupil 93 and having advanced toward the micro-lens 10. In addition, the photoelectric conversion unit 14 outputs a signal corresponding to the intensity of an image formed on the micro-lens 10 of the focus detection pixel 311 with the focus detection light flux 74 having passed through the focus detection pupil 94 and having advanced toward the micro-lens 10.

The outputs from the photoelectric conversion units 13 and 14 in the focus detection pixels 311 disposed in the focus detection pixel row L1 extending along the horizontal direction are integrated into output groups each corresponding to one of the two focus detection pupils 93 and 94. Through this process, information related to the intensity distributions of a pair of images formed on an array of focus detection pixels 311 disposed in the focus detection pixel row L1 extending along the horizontal direction with the focus detection light fluxes 73 and 74 passing through the focus detection pupil 93 and the focus detection pupil 94, is obtained. Image shift detection operation processing (correlation arithmetic processing, phase difference detection processing), to be detailed later, is subsequently executed by using the information thus obtained so as to detect an image shift amount representing the extent of image shift manifested in the focus detection pixel row L1 by the pair of images through a method known as the split-pupil phase detection method.

Likewise, based upon the signals output from the photoelectric conversion units 13 and 14 in the focus detection pixels 311 disposed in the focus detection pixel rows L2 through L8 extending along the horizontal direction, the image shift amounts, each indicating the extent of image shift manifested by the pair of images along the horizontal direction in a given focus detection pixel row, can be detected.

Then, by executing a conversion operation on the image shift amount in correspondence to the proportional relation of the focus detection pupil distance to the interval between the gravitational centers of the pair of focus detection pupils 93 and 94, the deviation (defocus amount) of the current image-forming plane relative to the predetermined image-forming plane is calculated. In more specific terms, the defocus amount, i.e., the deviation of the image-forming plane relative to the predetermined image-forming plane, manifesting along the direction in which the optical axis 91 extends, is calculated by multiplying the image shift amount, indicating the extent of image shift occurring within the plane ranging perpendicular to the optical axis 91, by a specific conversion coefficient. The specific conversion coefficient is a value obtained by dividing the focus detection pupil distance d by the interval between the gravitational centers of the focus detection pupils 93 and 94.

Figure 7:
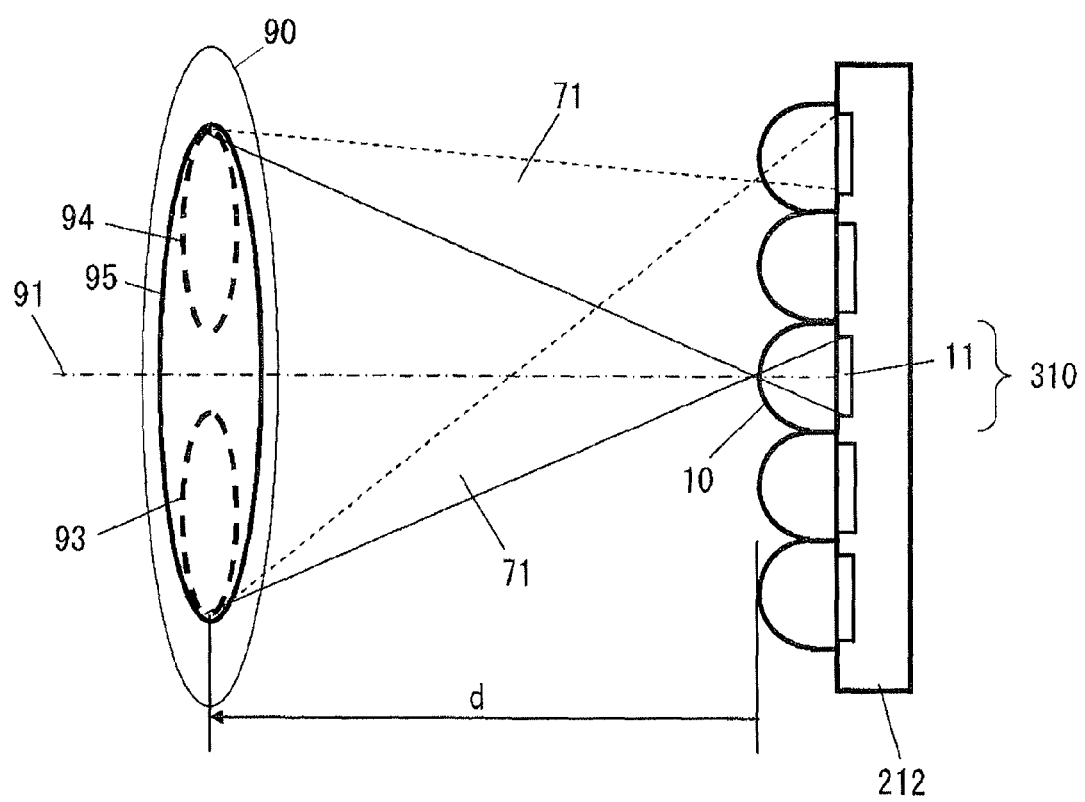

FIG. 7, which is to be referred to in comparison to FIG. 6, shows a photographic light flux received at image-capturing pixels 310 of the image-capturing element 212 shown in FIG. 4. FIG. 7 presents an enlarged schematic view of five successive image-capturing pixels 310, present near the photographic optical axis 91 in the image-capturing pixel row extending along the horizontal direction, which is located next to the focus detection pixel row L1 extending along the horizontal direction. It is to be noted that a repeated explanation of elements identical to those in FIG. 6 will not be provided.

The image-capturing pixels 310 each comprise a micro-lens 10, a photoelectric conversion unit 11 disposed to the rear of the micro-lens and the like. The shape of an opening in the light shielding mask present in close proximity to the photoelectric conversion unit 11 is projected via the micro-lens 10 onto the exit pupil 90 set apart from the micro-lens 10 by the focus detection pupil distance d. The shape of the projected image defines an area 95 that substantially circumscribes the focus detection pupils 93 and 94. The photoelectric conversion unit 11 outputs a signal corresponding to the intensity of an image formed on the micro-lens 10 with a photographic light flux 71 having passed through the area 95 and having advanced toward the micro-lens 10. Namely, the plurality of image-capturing pixels 310 receive the photographic light flux 71 having originated from the subject and passed through the interchangeable lens 202, and output subject image signals corresponding to the subject image resulting from photoelectric conversion over predetermined frame intervals.

Figure 8:
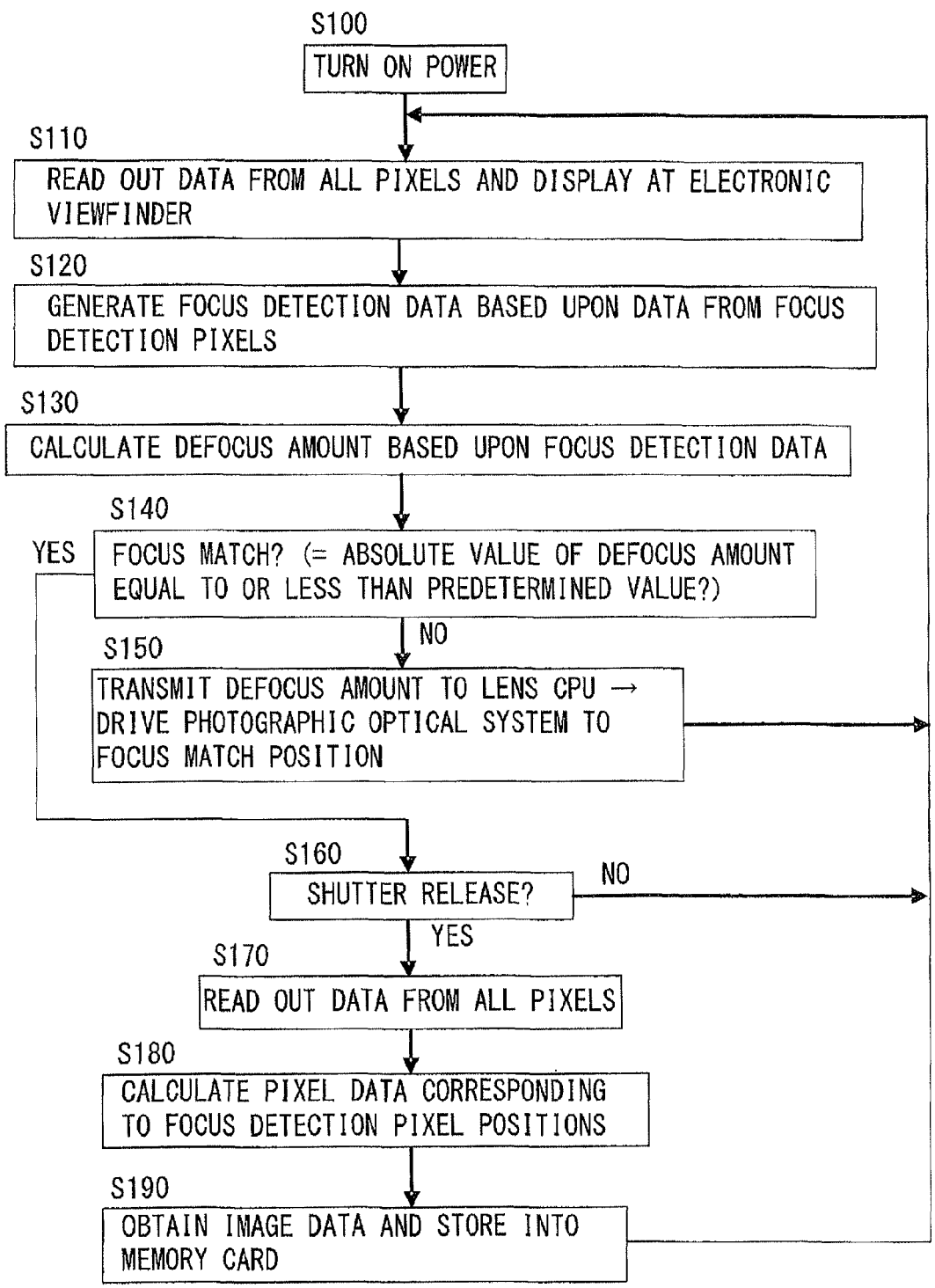

FIG. 8 presents a flowchart of an image-capturing operation that includes the focus detection operation as part thereof, executed in the digital still camera (image-capturing apparatus) 201 equipped with the focus detection device achieved in the embodiment. As power to the digital still camera 201 is turned on in step S100, the body drive control device 214 starts the image-capturing operation to be executed in step S110 and subsequent steps. In step S110, the image-capturing element control unit 220 in the body drive control device 214 reads out pixel data from all the pixels, and the CPU 222 in the body drive control device 214 brings up a display at the liquid crystal display element 216 based upon the pixel data from the image-capturing pixels 310. In the following step S120, the CPU 222 in the body drive control device 214 generates focus detection data, to be used for purposes of focus detection, based upon pixel data from focus detection pixels 311. The focus detection data generation processing executed in this step will be described in detail later.

In step S130, the CPU 222 in the body drive control device 214 executes a phase difference detection operation (image shift detection operation) for the focus detection area 101 based upon the focus detection data. The CPU 222 in the body drive control device 214 then calculates a defocus amount based upon the phase difference (image shift amount) detected through the phase difference detection operation.

In step S140, the CPU 222 in the body drive control device 214 makes a decision as to whether or not the current focusing condition is close to the focus match state, i.e., whether or not the absolute value of the calculated defocus amount is equal to or less than a predetermined value. If it is decided that the current condition is not close to the focus match state, the processing proceeds to step S150, in which the CPU 222 in the body drive control device 214 transmits the defocus amount to the lens drive control device 206 so as to drive, via the lens drive control device 206, the focusing lens 210 in the interchangeable lens 202 to the focus match position. Subsequently, the processing returns to step S110 to repeatedly execute the operation described above.

It is to be noted that the operation also branches to step S150 if focus detection cannot be executed. In this case, the CPU 222 in the body drive control device 214 transmits a scan-drive instruction to the lens drive control device 206 so as to scan-drive, via the lens drive control device 206, the focusing lens 210 in the interchangeable lens 202 over the range between infinity and maximum close-up. The processing then returns to step S110 to repeatedly execute the operation described above.

If it is decided in step S140 that the current condition is close to the focus match state, the processing proceeds to step S160. In step S160, the CPU 222 in the body drive control device 214 makes a decision as to whether or not a shutter release has occurred in response to an operation at a shutter release button (not shown). If it is decided that a shutter release has not occurred, the processing returns to step S110 to repeatedly execute the operation described above. If it is decided that a shutter release has occurred, the processing proceeds to step S170. In step S170, the CPU 222 in the body drive control device 214 transmits an aperture adjustment instruction to the lens drive control device 206 so as to adjust the aperture number at the interchangeable lens 202 to a control f-number (an f-number selected by the photographer or an automatically set f-number). Upon completion of the aperture control, the image-capturing element control unit 220 in the body drive control device 214 engages the image-capturing element 212 in image-capturing operation and reads out pixel data from the image-capturing pixels 310 and all the focus detection pixels 311 in the image-capturing element 212.

In step S180, the CPU 222 in the body drive control device 214 generates, through calculation, pixel data to be used as image data corresponding to the positions occupied by the individual focus detection pixels 311 based upon the pixel data from the focus detection pixels 311 by adding together the data output from the pair of photoelectric conversion units 13 and 14 disposed in each focus detection pixel 311. In the following step S190, the CPU 222 in the body drive control device 214 obtains the pixel data to be used as image data from the image-capturing pixels 310 and the image data corresponding to the focus detection pixel positions and stores the data thus obtained into the memory card 219. These image data are obtained based upon the photographic light flux 71 departing the subject and passing through the interchangeable lens 202 when the focusing lens 210 in the interchangeable lens 202 is at the focus match position. The processing then returns to step S110 to repeatedly execute the operation described above.

It is to be noted that the operation in step S110 through step S160 is repeatedly executed by interlocking with a frame readout operation through which the pixel data for one frame are cyclically read out from the image-capturing element 212 over predetermined frame intervals.

The image shift detection operation processing (correlation arithmetic processing, phase difference detection processing) executed in step S130 in FIG. 8 will be described in detail below. Since the focus detection pupils 93 and 94 may be vignetted by the aperture opening at the lens, a perfect balance may not be achieved with regard to the amounts of light in the pair of images detected via the focus detection pixels 311. Accordingly, in step S130, the CPU 222 in the body drive control device 214 executes a specific type of correlation operation that allows a desired level of image shift detection accuracy to be maintained in spite of the imbalance in the amounts of light. The correlation operation is executed on a pair of focus detection image signals $A1_n$, $(A1_1, \ldots, A1_M$; M represents the number of signals) and $A2_n$ $(A2_1, \ldots, A2_M)$, as expressed in correlation operation expression (1) in the known art, which is disclosed in Japanese Laid Open Patent Publication No. 2007-333720, so as to calculate a correlation quantity C(k). In expression (1), the $\Sigma$ operation is cumulatively executed with regard to the variable n. The range assumed for the variable n is limited to the range over which the data $A1_n$, $A1_{n+1}$, $A2_{n+k}$ and $A2_{n+1+k}$ exist in correspondence to the image shift amount k. The image shift amount k is an integer that represents a relative shift amount assuming a value taken in units matching the data interval with which the data in the signal strings constituting the pair of signals are sampled.

$$C(k)=\Sigma|A1_n \cdot A2_{n+1+k} - A2_{n+k} \cdot A1_{n+1}| \qquad (1)$$

Provided that a minimum value C(X) among values taken for a correlation quantity C(x) represented by a continuous line in correspondence to the correlation quantity C(k) calculated to take on discrete values as expressed in (1) above is ascertained, a shift amount X, at which the minimum value C(X) among the values of the correlation quantities C(x) represented by a continuous line, is achieved, is converted to an image shift amount shft as expressed in (2) below. The coefficient PY in expression (2) represents the pixel pitch with which the focus detection pixels 311 in the focus detection pixel rows L1 through L8 are disposed, i.e., a value twice the pixel pitch with which pixels are arrayed at the image-capturing element 212.

$$shft = PY \cdot X \qquad (2)$$

In reference to the processing flowchart presented in FIG. 9, the focus detection data generation executed based upon the pixel data from focus detection pixels 311 in step S120 in FIG. 8 will be described in detail. N focus detection pixels 311 are disposed in each focus detection pixel row among the focus detection pixel rows L1 through L8 in FIG. 4. The letter n (n=numeral 1~N) indicates the position taken along the horizontal direction by a given focus detection pixel 311 disposed in a focus detection pixel row Lp (p=1, 2, . . . , 8). The sth (s=1, 2) photoelectric conversion unit in the pair of photoelectric conversion units 13 and 14 in the nth focus detection pixel 311 in the focus detection pixel row Lp outputs data B(s, n, p). Namely, the pair of photoelectric conversion units 13 and 14 output a pair of sets of data B(1, n, p) and B(2, n, p) respectively.

In step S200, the CPU 222 in the body drive control device 214 checks the values indicated in the pixel data from the focus detection pixels 311 disposed in the focus detection pixel row L1 in FIG. 3 so as to determine whether or not the largest value indicated by the pixel data exceeds a predetermined threshold value T1. Namely, it checks the pixel data to determine whether or not the condition expressed in (3) is satisfied. If the largest value indicated by the pixel data from the focus detection pixels 311 in the focus detection pixel row L1 exceeds the predetermined threshold value T1, the output level at the focus detection pixels 311 is sufficiently high for focus detection. Max ( ) in expression (3) is a function for determining the largest value.

$$\mathrm{Max}(B(s,n,1)) > T1 \quad (3)$$

If it is decided in step S200 that the condition expressed in (3) is satisfied, the processing proceeds to step S210. In step S210, the CPU 222 in the body drive control device 214 designates the pixel data from the focus detection pixels 311 disposed in the focus detection pixel row L1 (p=1) as focus detection data B0(s, n) as expressed in (4) below. The processing then proceeds to step S310.

$$B0(s,n) = B(s,n,1) \ s=1,2 \text{ and } n=1\sim N \quad (4)$$

If, on the other hand, it is decided in step S200 that the condition expressed in (3) is not satisfied, the processing proceeds to step S220. In step S220, the CPU 222 in the body drive control device 214 adds up the pixel data from the focus detection pixels 311 in the focus detection pixel row L1 and the pixel data from the focus detection pixels 311 in the focus detection pixel row L2, i.e., the next focus detection pixel row following the focus detection pixel row L1, through spatial accumulation. Data B1(s, n, 2) are obtained through the spatial accumulation operation executed as expressed in (5) below to add up the data output from the matching photoelectric conversion units in focus detection pixels disposed at matching positions along the horizontal direction, i.e., sharing a common value for the variable n. In expression (5), s=1, 2 and n=1~N.

$$B1(s,n,2) = B1(s,n,1) + B(s,n,2) \quad (5)$$

Namely, the pixel data from the focus detection pixels 311 set closest to each other along the vertical direction are spatially accumulated (spatial accumulation) as indicated in expression (5), and thus, data B1(s, n, p) corresponding to the focus detection pixels 311 are obtained through spatial accumulation operations executed as described above in conjunction with focus detection pixel rows L1 through Lp. It is to be noted that the data B1(s, n, 1) are identical to the data B(s, n, 1).

In step S230, the CPU 222 in the body drive control device 214 checks the data B1(s, n, p) (p=2 when the processing in this step is executed for the first time) generated through the spatial accumulation to determine whether or not the largest value indicated by the data exceeds the predetermined threshold value T1, i.e., whether or not the condition expressed in (6) below is satisfied. In expression (6), s=1, 2 and n=1~N.

$$\mathrm{Max}(B1(s,n,p)) > T1 \quad (6)$$

If it is decided in step S230 that the condition expressed in (6) is satisfied, the processing proceeds to step S240. In step S240, the CPU 222 in the body drive control device 214 designates the data B1 (s, n, p) corresponding to the focus detection pixels 311, obtained through the spatial accumulation operations executed up to the focus detection pixel row Lp, as focus detection data B0(s, n) as expressed in (7) below. The processing then proceeds to step S310. In expression (7), s=1, 2 and n=1~N.

$$B0(s,n) = B1(s,n,p) \quad (7)$$

If, on the other hand, it is decided in step S230 that the condition expressed in (6) is not satisfied, the processing proceeds to step S240. In step S240, the CPU 222 in the body drive control device 214 checks the number of spatial accumulation operations executed so far to determine whether or not a spatial accumulation operation has been executed up to the focus detection pixel row L8, i.e., whether or not the number of times the accumulation operation has been executed is equal to the maximum number of accumulation operations of 7. If it is decided that the spatial accumulation processing has not been executed through the focus detection pixel row L8 yet, the processing returns to step S220. In step S220, the CPU 222 in the body drive control device 214 executes a spatial accumulation operation as expressed in (8) below so as to calculate cumulative values by adding data B(s, n, p+1) from the focus detection pixels 311 disposed in the next focus detection pixel row L(p+1) to the data B1(s, n, p) corresponding to the focus detection pixels 311 in conjunction with which the spatial accumulation operations have been executed so far. In expression (8), s=1, 2 and n=1~N.

$$B1(s,n,p+1) = B1(s,n,p) + B(s,n,p+1) \quad (8)$$

As the processing cycles through the loop formed with step S220, step S230 and step S240 and it is finally decided in step S240 that the number of spatial accumulation operations executed so far has reached the maximum number of accumulation operations, i.e., when there are no more focus detection pixel rows and thus, no more spatial accumulation operations can be executed, the processing proceeds to step S260. In this case, spatially accumulated data B2(s, n, 0) will have been obtained for the most recent frame by spatially accumulating the data from the focus detection pixels 311 disposed in the focus detection pixel rows L1 through L8. In step S260, the CPU 222 in the body drive control device 214 reads out the pixel data from the focus detection pixels 311, stored in the internal memory 223 for the frame preceding by 1 frame, and executes a spatial accumulation operation as expressed in (9) below with the data from the focus detection pixels 311 disposed in the focus detection pixel rows L1 through L8. Through this step, spatially accumulated data B2(s, n, v) are obtained in conjunction with the data output from the focus detection pixels 311 for the frame preceding the most recent frame by v frames (v=1 when the processing in step S260 is executed for the first time). It is assumed that the oldest data held in the internal memory 223 are the focus detection pixel data corresponding to the frame preceding the most recent frame by 10 frames (v=10). In the expression (9), the Σ operation is executed for p=1~8.

$$B2(s,n,v) = \Sigma B(s,n,p) \quad (9)$$

In step S270, the CPU 222 in the body drive control device 214 executes a temporal accumulation operation, as expressed in (10) below, so as to calculate cumulative values by adding the spatially accumulated data B2(s, n, v), calculated in step S260 for the frame preceding by 1 frame, to temporally accumulated data B3(s, n, v−1) obtained in conjunction with the frames with which the temporal accumulation operation has been executed so far. In expression (10), s=1, 2 and n=1~N.

$$B3(s,n,v)=B3(s,n,v-1)+B2(s,n,v) \quad (10)$$

Namely, the spatially accumulated data for temporally successive past frames are temporally accumulated (temporal accumulation) as expressed in (10) and as a result, the temporally accumulated data B3(s, n, v) are obtained. The temporally accumulated data B3(s, n, v) are focus detection pixel data obtained by temporally accumulating the spatially accumulated data B2(s, n, v) corresponding to the most recent frame through the frame preceding the most recent frame by v frames. It is to be noted that the temporally accumulated data B3(s, n, 0) are the same as the spatially accumulated data B2(s, n, 0) and also identical to the data B1(s, n, 8).

In step S280, the CPU 222 in the body drive control device 214 checks the data B3(s, n, v) obtained through the temporal accumulation to determine whether or not the largest value indicated by the data exceeds the predetermined threshold value T1, i.e., whether or not the condition expressed in (11) is satisfied. When the decision-making processing in step S280 is executed for the first time v=1.

$$\text{Max}(B3(s,n,v))>T1 \quad (11)$$

If it is decided in step S280 that the condition expressed in (11) is satisfied, the processing proceeds to step S290. In step S290, the CPU 222 in the body drive control device 214 designates the temporally accumulated data B3(s, n, v), obtained by temporally accumulating the focus detection pixel data corresponding to the most recent frame through the frame preceding the most recent frame by v as focus detection data B0(s, n), as expressed in (12) below. In expression (12), s=1, 2 and n=1~N. The processing then proceeds to step S310.

$$B0(s,n)=B3(s,n,v) \quad (12)$$

If, on the other hand, it is decided in step S280 that the condition expressed in (11) is not satisfied, the processing proceeds to step S300. In step S300, the CPU 222 in the body drive control device 214 checks the number of temporal accumulation operations that have been executed to determine whether or not the temporal accumulation operation has been executed for the frame preceding the most recent frame by 10, i.e., whether or not the number of temporal accumulation operations executed so far has reached the maximum number of 10. If it is decided that the temporal accumulation operation for the frame preceding the most recent frame by 10 has not been executed yet, the processing returns to step S260, in which the CPU 222 in the body drive control device 214 executes a spatial accumulation operation for the past frame immediately preceding the frame for which the temporal accumulation operation has been executed most recently. The processing thus cycles through the loop constituted with the steps S260, S270, S280 and S300 again.

Upon deciding in step S300 that the number of temporal accumulation operations executed thus far has reached the maximum number of 10, the CPU 222 in the body drive control device 214 designates the temporally accumulated data B3(s, n, 10), obtained by temporally accumulating the focus detection pixel data corresponding to the most recent frame through the frame preceding the most recent frame by 10, as focus detection data B0(s, n) in step S290. The processing then proceeds to step S310.

In step S310, the pixel data output from the focus detection pixels 311 for the most recent frame are stored into the internal memory 223 in preparation for the focus detection operation processing to be executed for the next frame. The processing is then directed to proceed to step S130 in the flowchart presented in FIG. 8. At this time, the focus detection data B0(s, n) are read and used as the pair of image signals $A1_n(A1_1, \ldots, A1_M;$ M indicates the number of sets of data), $A2_n(A2_1, \ldots, A2_M)$ for focus detection executed as expressed in (1).

Figure 9:
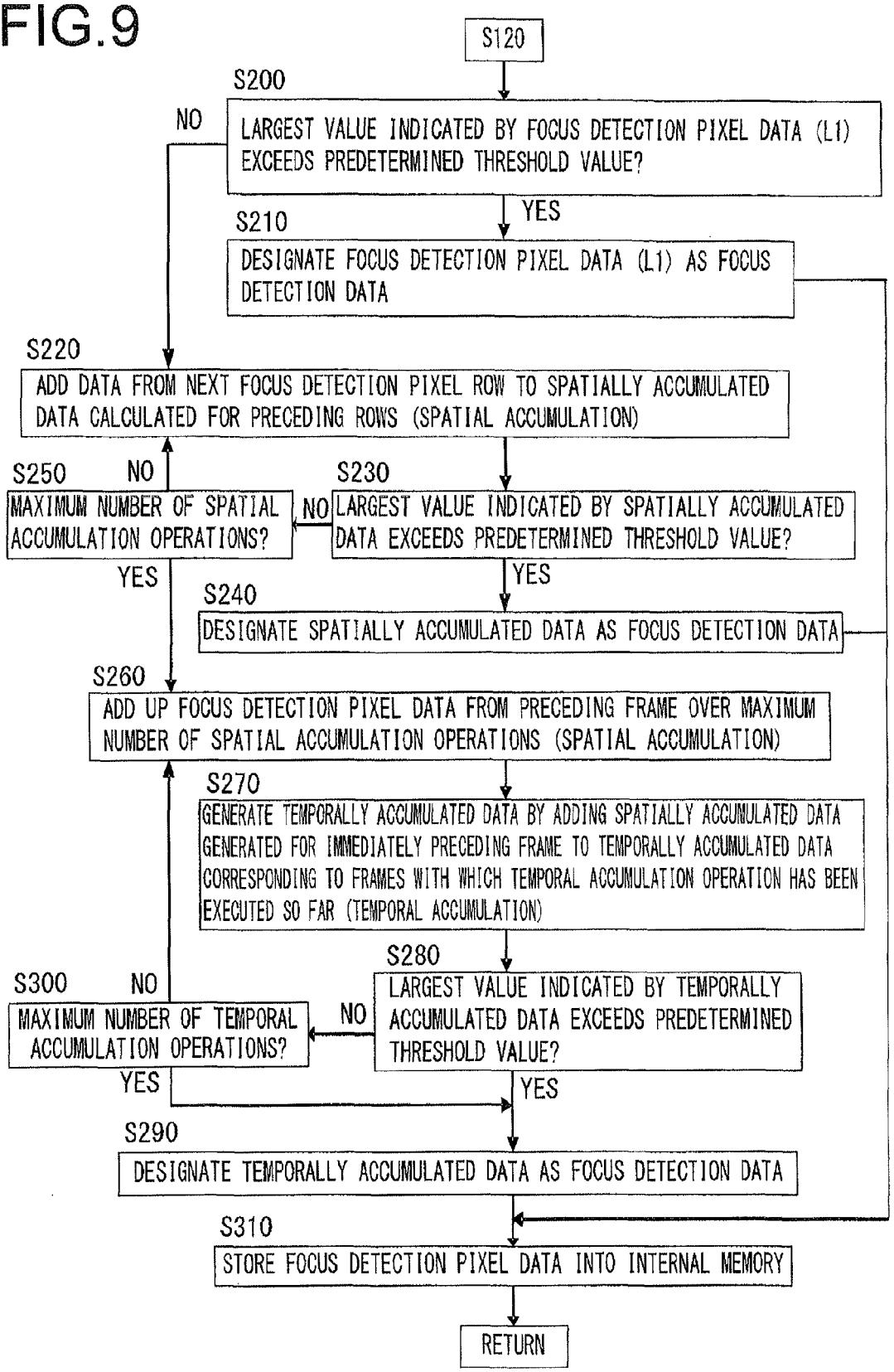
Figure 10:
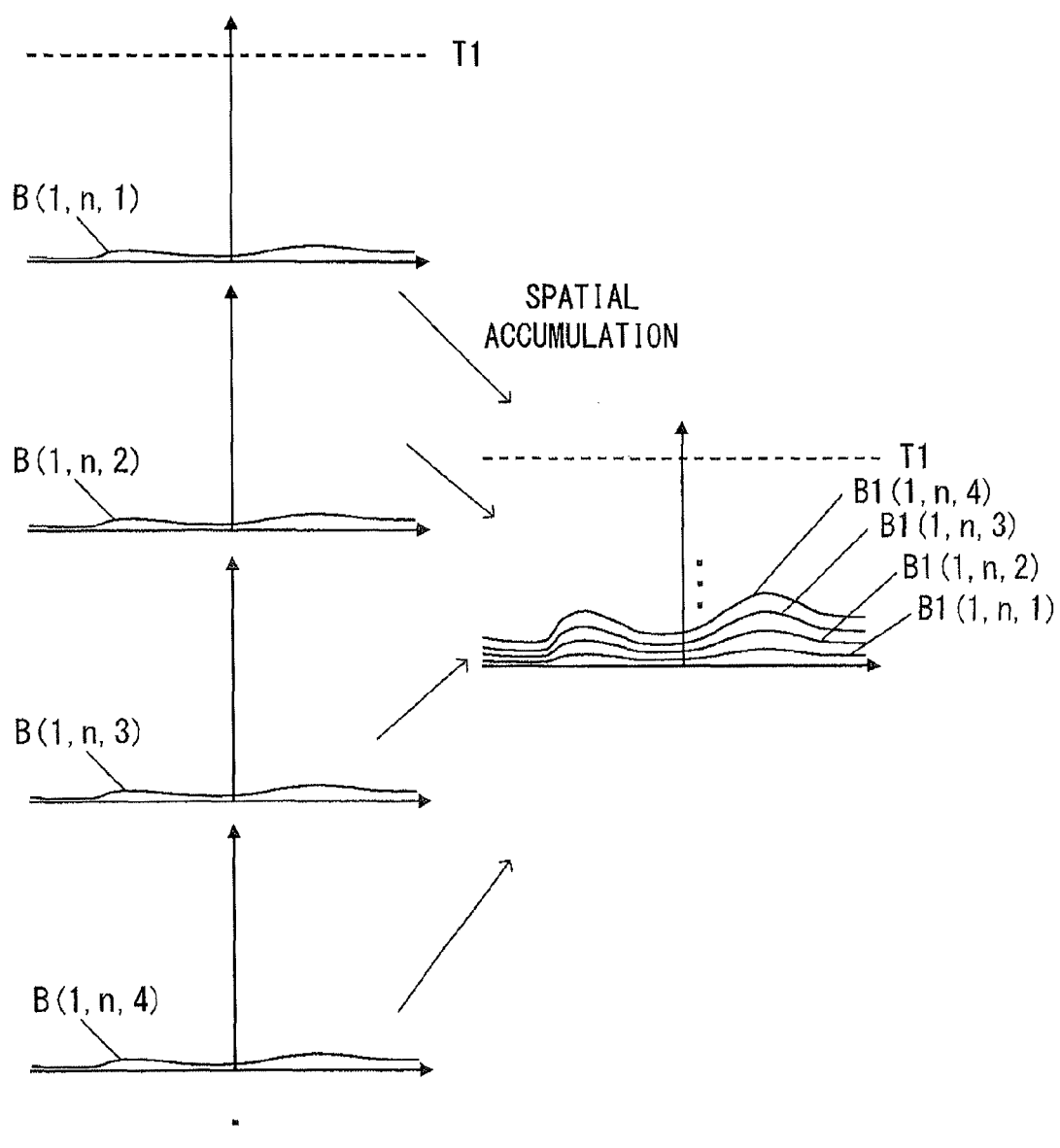
Figure 11:
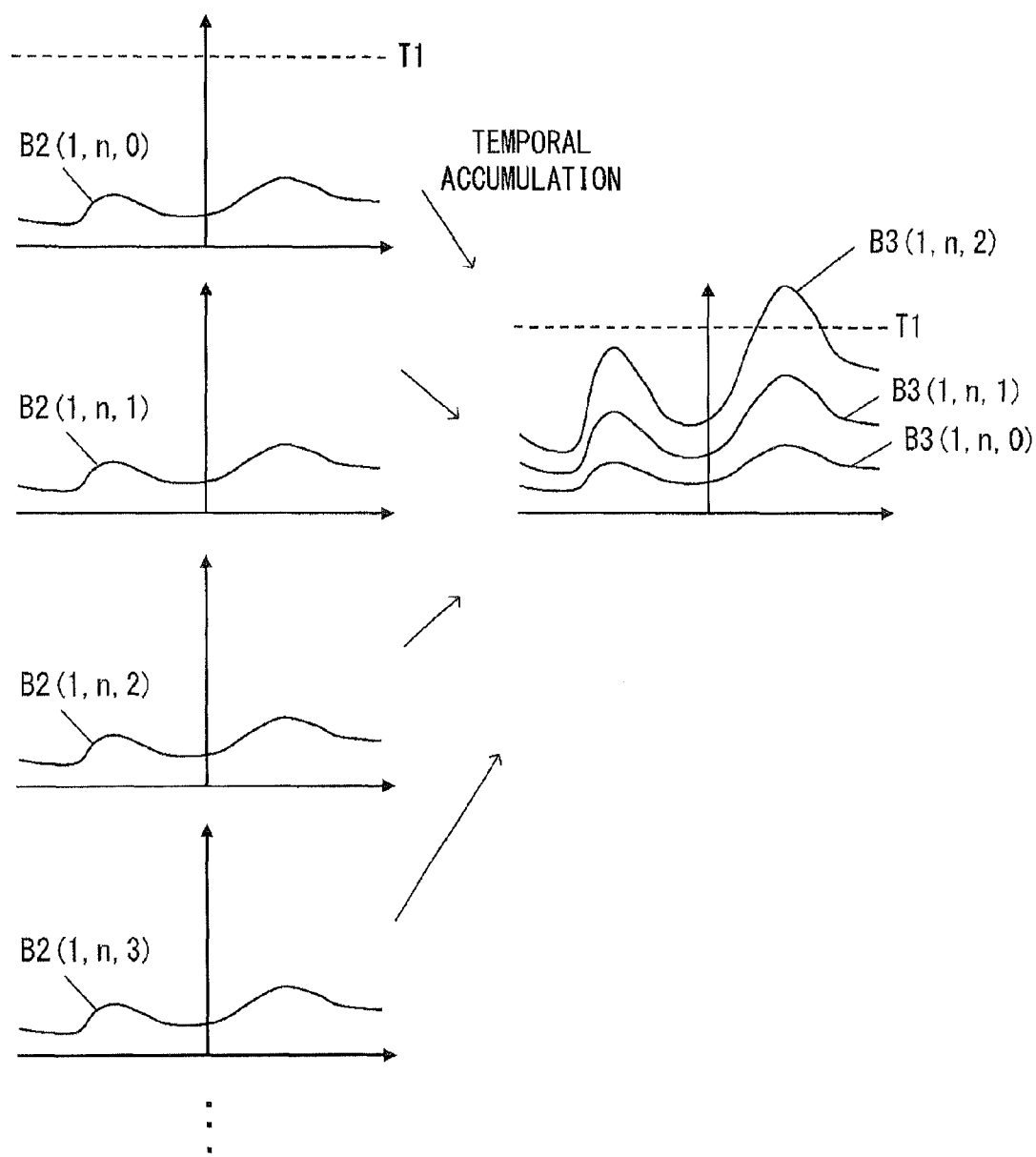

The operations described in reference to the flowchart presented in FIG. 9 are illustrated in FIG. 10 and FIG. 11 from the viewpoint of data processing. In the graphs presented in FIG. 10 and FIG. 11, the data value is indicated along the vertical axis and the data position (taken along the horizontal direction) is indicated along the horizontal axis. FIG. 10 indicates that as the focus detection pixel data are sequentially added up through spatial accumulation, starting with the focus detection pixel row L1, spatially accumulated data are generated. It is to be noted that the figure only shows the spatial accumulation of one of the pair of image signals (s=1) for simplification. FIG. 10 illustrates how spatial accumulation processing is executed in conjunction with the data output from the focus detection pixels 311 for the most recent frame. FIG. 10 indicates that if the largest value indicated by the pixel data from the focus detection pixels 311 disposed in the focus detection pixel row L1 does not exceed the predetermined threshold value T1, the data from the focus detection pixels 311 in the focus detection pixel rows L2, L3, . . . are added up in sequence with the pixel data from the focus detection pixels 311 in the focus detection pixel row L1 for spatial accumulation and that if even the largest value indicated by the spatially accumulated data obtained by adding up the pixel data from the focus detection pixels 311 in the focus detection pixel row L8 does not exceed the predetermined threshold value T1, the processing proceeds to the temporal accumulation processing illustrated in FIG. 11. In the spatial accumulation processing executed in conjunction with the plurality of focus detection pixel rows, the data from the focus detection pixels in different pixel rows assuming the same value for n, i.e., taking up matching pixel positions along the horizontal direction, are added together. The focus detection pixels, the data from which are added together for spatial accumulation, are disposed closest to each other along the vertical direction.

As FIG. 11 indicates, if the largest value indicated by the spatially accumulated data for the most recent frame does not exceed the predetermined threshold value T1, spatially accumulated data are temporally accumulated in sequence for temporal accumulation, by adding the spatially accumulated data for the immediately preceding frame to those corresponding to the most recent frame, then adding the spatially accumulated data corresponding to the frame preceding the most recent frame by 2, . . . , and finally adding the spatially accumulated data corresponding to the frame preceding the most recent frame by 10. Once the largest value indicated by the temporally accumulated data obtained by temporally accumulating spatially accumulated data exceeds the predetermined threshold value T1, the temporal accumulation processing ends.

Figure 12:
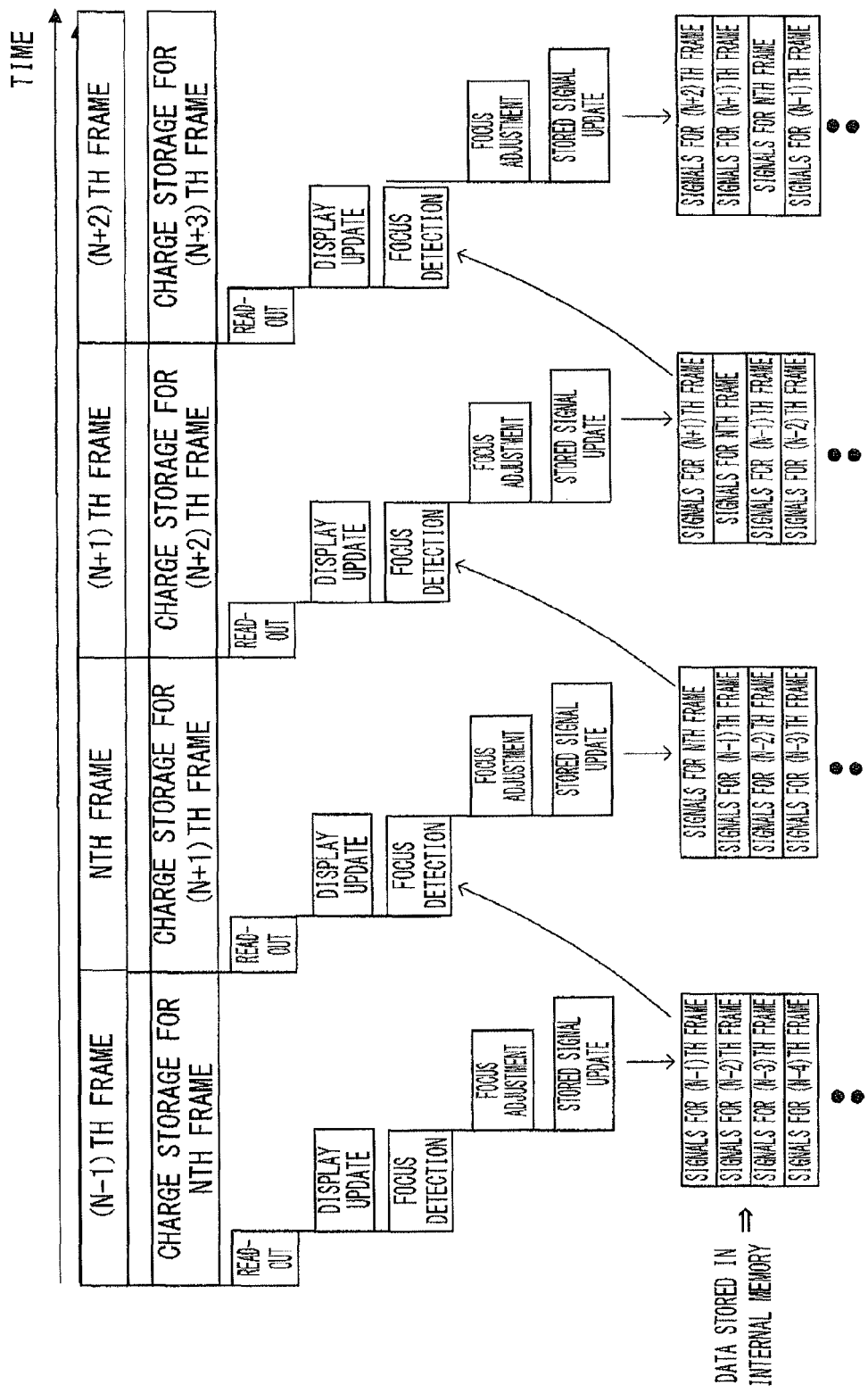

FIG. 12 presents a timing chart of the operation described in reference to the flowchart presented in FIG. 8. In the operation shown in FIG. 12, the pixel data output from the image-capturing pixels and focus detection pixels are read out from the image-capturing element 212 at a specific frame rate (e.g., 1/60 sec). FIG. 12 shows the operation executed over four frames from a (N−1)th frame through a (N+2)th frame. The operation executed in correspondence to the Nth frame will be described as a typical example. First, the image data (pixel data from the image-capturing pixels 310 and the pixel data from the focus detection pixels 311) for the Nth frame, generated by storing electrical charges during the (N−1)th frame readout, are read from the image-capturing element 212. At the same time, electric charge storage for the (N+1)th frame starts at the image-capturing element 212. Once the image data readout is completed, the live view image display is updated based upon the pixel data from the image-capturing pixel 310 having been read out. In addition, the defocus amount corresponding to the Nth frame generation time point is calculated through focus detection operation executed based upon the pixel data output from the focus detection pixels 311 in correspondence to the Nth frame and the pixel data (signals) corresponding to the focus detection pixels 311 stored for the (N−1)th frame and preceding frames at the (N−1)th frame generation time point. Based upon the defocus amount thus calculated, focus adjustment is executed and the pixel data (signals) output from the focus detection pixels 311 for the Nth frame are stored into the internal memory 223. This operation is repeatedly executed for successive frames.

In the embodiment described above, a plurality of focus detection pixels 311 are disposed in each of the eight focus detection pixel rows L1 through L8 extending along the horizontal direction, as illustrated in FIG. 4, and spatial accumulation operations are executed to a maximum of 7 times to add up the pixel data from the focus detection pixels 311 along the vertical direction. However, the present invention is not limited to this example and it may be adopted in conjunction with any number of focus detection pixel rows Lp equal to or greater than eight. The upper limit to the number of spatial accumulation operations that may be executed (maximum number of accumulation operations) may be determined through testing so as to ensure that a lowered high-frequency component in the image, attributable to the vertical spatial accumulation, will not result in poor focus detection accuracy. For instance, the upper limit Nmax for the number of spatial accumulation operations N can be determined by ensuring that the condition expressed in (13) below is satisfied in conjunction with focus detection pixels 311 disposed in every other row as shown in FIG. 4 with a pixel pitch Pa.

$$N \leq N\mathrm{max} = Ca/(2 \cdot Pa) \quad (13)$$

The constant Ca, which is determined through testing, is dependent upon the lowest spatial frequency at which the required level of focus detection accuracy can be sustained on the predetermined focal plane. Since higher focus detection accuracy is assured at a higher spatial frequency, the constant Ca may be set, for instance, as the reciprocal of the lowest spatial frequency. Thus, when the lowest spatial frequency is 10 lines/mm, the constant Ca will be 100 µm. Assuming that the pixel pitch Pa is 5 µm, the intervals between the focus detection pixels will be twice the pixel pitch Pa, i.e., 10 µm, and accordingly, Nmax will be calculated as 100 µm/10 µm=10, as expressed in (13). In addition, by adjusting the lowest spatial frequency in correspondence to photographic factors that are bound to affect the focus detection accuracy, such as the extent of image movement, the extent of camera vibration, the aperture number set at the photographic lens, the brightness in the photographic field, the photographic mode selected at the camera (still subject photographing mode/moving subject photographing mode) and the like, an upper limit Nmax to the number of spatial accumulation operations N, optimal for a specific focus detection operation, can be selected in a flexible manner.

An explanation has been given on an example in which the focus detection pixel data corresponding to each frame are directly stored into the internal memory 223. However, since focus detection pixel data other than those corresponding to the most recent frame first undergo spatial accumulation before they are used for focus detection data generation, the focus detection pixel data may be spatially accumulated (over eight rows) and the resulting spatially accumulated data may then be stored into the internal memory 223 in the first place. For instance, when updating the signals stored in correspondence to a given frame in FIG. 12, the focus detection pixel data for the particular frame may be spatially accumulated (over eight rows) and the resulting spatially accumulated data (the spatially accumulated data for the Nth frame if the signals are being updated in correspondence to the Nth frame) may be stored into the internal memory 223. In this case, the spatially accumulated data generated in correspondence to the past frames, having been stored in the internal memory 223, will be used in focus detection executed for the next frame. Since the need to spatially accumulate the focus detection pixel data corresponding to the past frames each time the focus detection processing is executed, the length of time required for the arithmetic operation can be reduced and space in the internal memory 223 can be saved as well through these measures.

In the embodiment described above, a decision as to whether or not to continuously execute the accumulation processing is made by checking the accumulated data to determine whether or not the largest value indicated by the accumulated data exceeds a predetermined threshold value as the focus detection pixel data from individual rows along the vertical direction are added up one at a time in the spatial accumulation processing or as the spatially accumulated data from individual past frames are added up one at a time from the newest toward the oldest, in the temporal accumulation processing. This type of processing is advantageous in that focus detection is enabled even when subject patterns, different from one focus detection pixel row to another, are formed on the focus detection pixels or when the brightness in the photographic field abruptly changes from frame to frame. In addition, accumulation processing such as that described above may be controlled by using another evaluation value indicating data characteristics instead of the largest value indicated by the accumulated data, such as the average value among the values indicated by the accumulated data or the contrast value (the difference between the largest value and the smallest value).

Furthermore, as long as the spatial distance between the focus detection pixels, the data from which are added together through spatial accumulation, is small (in the example presented in FIG. 4, the focus detection pixel rows L1 through L8 over which data are added together through spatial accumulation are spatially set apart along the vertical direction by the maximum extent equivalent to only 14 pixels), it can be reasonably assumed that the focus detection pixels, the data from which are added up for spatial accumulation, receive light forming a substantially uniform subject pattern image. In addition, if the length of time required for temporal accumulation of the pixel data from each frame is 1/60 sec and the maximum number of temporal accumulation operations is set to approximately 10, as in step S300 in FIG. 9, the overall temporal accumulation will be completed in ⅙ sec for the 10 temporal accumulation operations, and under such circumstances, no significant error will result from the assumption that the brightness remains uniform instead of changing from frame to frame.

Figure 13:
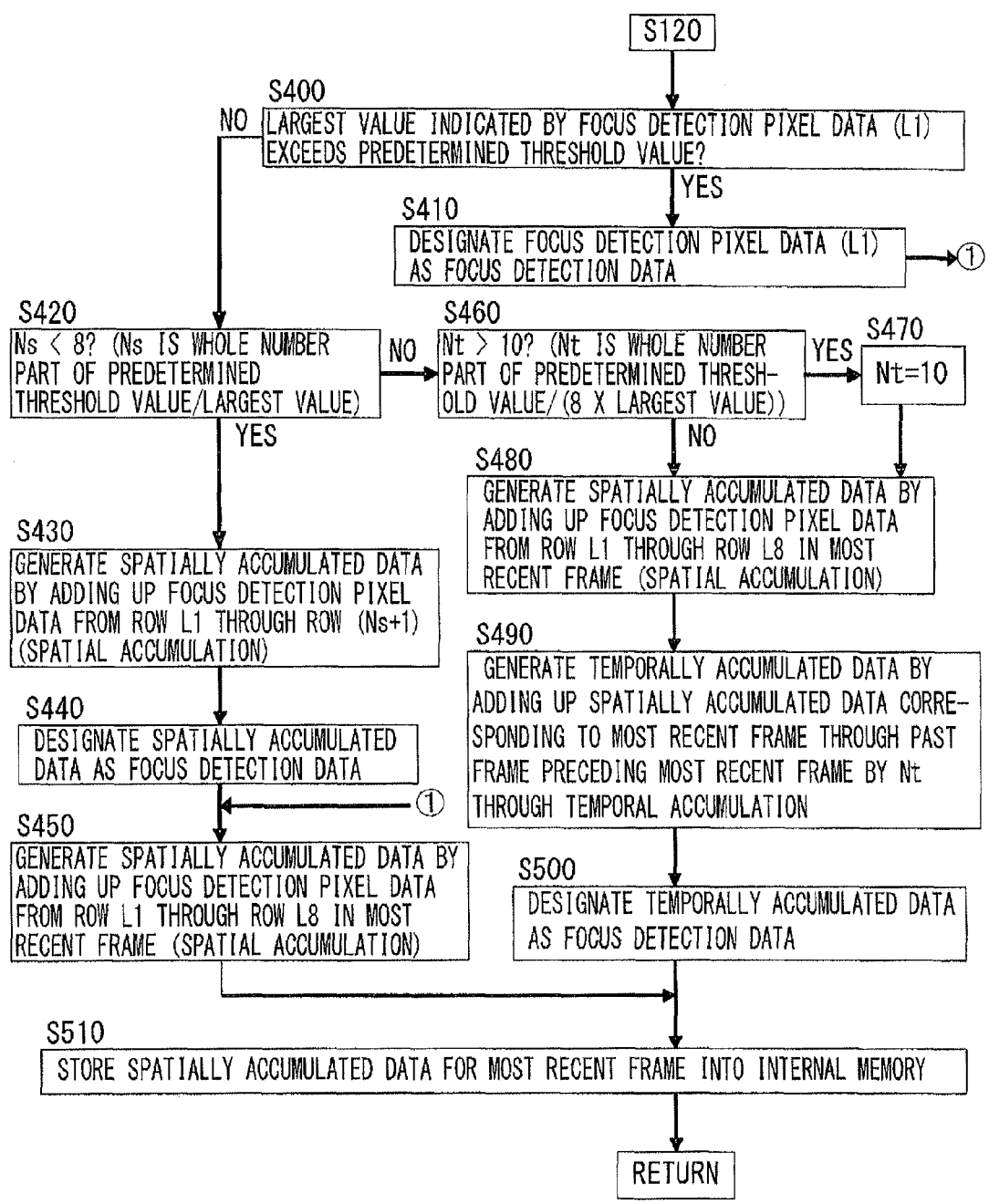

By assuming such spatial uniformity and temporal uniformity, the processing executed as shown in FIG. 9 may be further simplified, as shown in FIG. 13. It is to be noted that during the stored signal update processing executed in correspondence to each frame, the spatially accumulated data resulting from spatial accumulation of the data output from the focus detection pixels in correspondence to the particular frame, i.e., the spatially accumulated data $B2(s, n, v)$ for the with frame, are stored into the internal memory 223.

In step S400, the CPU 222 in the body drive control device 214 checks the values indicated in the focus detection pixel data so as to determine whether or not the largest value indicated by the pixel data exceeds a predetermined threshold value T1 (i.e., whether or not the condition expressed in (3) is satisfied).

If it is decided in step S400 that the condition expressed in (3) is satisfied, the processing proceeds to step S410, in which the CPU 222 in the body drive control device 214 designates the pixel data from the focus detection pixels disposed in the focus detection pixel row L1 as focus detection data as expressed in (4). The processing then proceeds to step S450.

If, on the other hand, it is decided in step S400 that the condition expressed in (7) is not satisfied, the processing proceeds to step S420, in which the CPU 222 in the body drive control device 214 checks the value obtained by dividing the predetermined threshold value T1 by the largest value Max $(B(s, n, 1))$ indicated by the focus detection pixel data to determine whether or not the whole number part Ns of the obtained value is equal to or smaller than the maximum number of spatial accumulation operations, i.e., 8 (whether or not the condition expressed in (14) is satisfied).

$$Ns<8 \tag{14}$$

If it is decided in step S420 that the condition expressed in (14) is satisfied, the processing proceeds to step S430, in which the CPU 222 in the body drive control device 214 spatially accumulates data up to the data from the focus detection pixels 311 in the (Ns+1)th focus detection pixel row L(Ns+1), as expressed in (15). Then, in step S440, the CPU 222 in the body drive control device 214 designates the spatially accumulated data $B1(s, n, Ns+1)$ as the focus detection data $B0(s, n)$. The processing then proceeds to step S450. It is to be noted that the Σ operation in expression (15) is executed for the variable m=1~Ns+1. In expression (15), s=1, 2 and n=1~N.

$$B0(s,n)=B1(s,n,Ns+1)=\Sigma B(s,n,m) \tag{15}$$

In step S450, the CPU 222 in the body drive control device 214 generates spatially accumulated data $B4(s, n)$, to be stored into the internal memory 223, as expressed in (16) below. The processing then proceeds to step S510. It is to be noted that the Σ operation in expression (16) is executed for the variable m=1~8. In expression (16), s=1, 2 and n=1~N.

$$B4(s,n)=B1(s,n,8)=\Sigma B(s,n,m) \tag{16}$$

If, on the other hand, it is decided in step S420 that the condition expressed in (14) is not satisfied, the processing proceeds to step S460, in which the CPU 222 in the body drive control device 214 checks the whole number part Nt of the value obtained by dividing the predetermined threshold value T1 by the value 8 times the largest value Max$(B(s, n, 1))$ indicated by the focus detection pixel data so as to determine whether or not the whole number part Nt is equal to or greater than 10 (whether or not the condition expressed in (17) is satisfied).

$$Nt>10 \tag{17}$$

If it is decided in step S460 that the condition expressed in (17) is satisfied, the processing proceeds to step S470, in which the CPU 222 in the body drive control device 214 determines the whole number part Nt to be 10. The processing then proceeds to step S480. However, if it is decided in step S460 that the condition expressed in (17) is not satisfied, the processing directly proceeds to step S480.

In step S480, the CPU 222 in the body drive control device 214 generates through calculation spatially accumulated data $B2(s, n, 0)$ for the most recent frame, as expressed in (16), just as it does in step S450, by spatially accumulating the focus detection pixel data in the most recent frame from the focus detection pixel row L1 through the focus detection pixel row L8.

In step S490, the CPU 222 in the body drive control device 214 generates through calculation temporally accumulated data $B3(s, n, Nt)$ as expressed in (18) below by using the spatially accumulated data $B2(s, n, 0)$ for the most recent frame (referred to as an Nath frame) and the spatially accumulated data $B2(s, n, 1)$ through $B2(s, n, Nt)$ stored in the internal memory 223 in correspondence to the past Nt frames. In step S500, the CPU 222 in the body drive control device 214 designates the temporally accumulated data $B3(s, n, Nt)$ as focus detection data $B0(s, n)$. It is to be noted that the Σ operation in expression (18) is executed for the variable m=0 Nt. In expression (18), s=1, 2 and n=1~N.

$$B0(s,n)=B3(s,n,Nt)=\Sigma B2(s,n,m) \tag{18}$$

In step S510, the CPU 222 in the body drive control device 214 stores the spatially accumulated data generated for the most recent frame into the internal memory 223 in preparation for the focus detection operation processing to be executed for the next frame. The processing is then directed to proceed to step S130 in the flowchart presented in FIG. 8.

In the processing flow shown in FIG. 13, the number of spatial accumulation operations and the number of temporal accumulation operations are already set at the initial stage of the processing. This processing flow differs from that shown in FIG. 9 in that the need to execute decision-making processing for each processing loop is eliminated and thus, the processing flow in FIG. 13 does not require as much time. Furthermore, since the spatially accumulated data are stored in correspondence to each frame, less memory capacity is required in the internal memory 223.

Moreover, instead of storing the spatially accumulated data corresponding to the individual frames into the internal memory 223, temporally accumulated data may be generated through calculation in correspondence to each frame by adding up data over up to 10 past frames and the temporally accumulated data thus generated may be stored into the internal memory 223.

Figure 14:
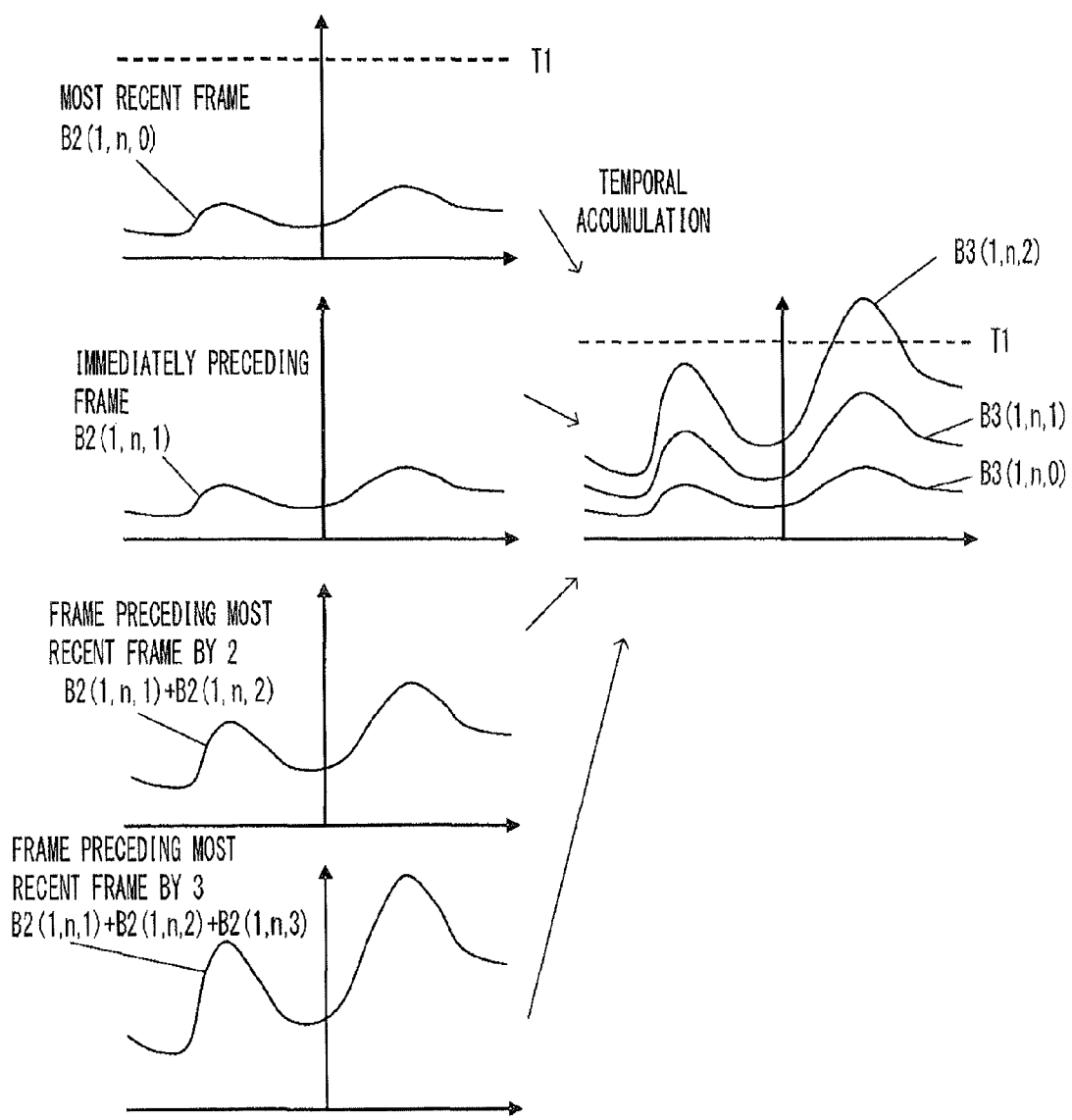

Namely, in the stored signal update processing executed as shown in FIG. 12 to update the signals stored in correspondence to each frame, data obtained by adding up, through temporal accumulation, the spatially accumulated data corresponding to the most recent frame to the temporally accumulated data for up to 10 past frames having been stored in correspondence to the immediately preceding frame, are stored for an update. In this case, temporally accumulated data corresponding to the most recent frame through the frame preceding the most recent frame by up to v frames are stored in the internal memory 223. In reference to FIG. 14, which corresponds to FIG. 11, the use of such temporally accumulated data in focus detection, stored in the internal memory 223 as described above, will be described. When the processing is executed in correspondence to the most recent frame, the temporally accumulated data (i.e., the spatially accumulated data B2(s, n, 1)) for the immediately preceding frame, the temporally accumulated data (B2(s, n, 1)+B2(s, n, 2)) generated by adding up the data for the immediately preceding frame and the data for the frame preceding the most recent frame by 2, the temporally accumulated data (B2(s, n, 1)+B2(s, n, 2)+B2(s, n, 3)) generated by adding together the data for the immediately preceding frame, the data for the frame preceding the most recent frame by 2 and the data for the frame preceding the most recent frame by 3, . . . , are recorded in the internal memory 223. If temporally accumulated data B3(s, n, Nt) corresponding to the most recent frame through the frame preceding it by Nt are needed, the data can be generated through temporal accumulation simply by adding the spatially accumulated data B2(s, n, 0) for the most recent frame directly to the temporally accumulated data (B2(s, n, 1)+B2(s, n, 2)+B2(s, n, 3)+ . . . , +B2(s, n, Nt)) corresponding to the frame immediately preceding the most recent frame through the frame preceding the most recent frame by Nt.

In this system, when generating through calculation temporally accumulated data to be used for purposes of focus detection, the temporally accumulated data generated in advance by adding together the data for the immediately preceding frame through the frame preceding the most recent frame by Nt through temporal accumulation, are ready to be read out from the internal memory 223. As a result, an improvement is achieved in the processing speed with which the focus detection operation is executed. In addition, a further improvement in the processing speed can be achieved by executing the arithmetic operation for temporally accumulated data generation and updating the data stored in the internal memory 223 via a separate, dedicated arithmetic operation circuit other than the CPU 222.

The digital still camera 201 configured as an image-capturing apparatus equipped with the focus detection device achieved in the first embodiment described above includes the image-capturing element (image sensor) 212 and the body drive control device 214.

A plurality of focus detection pixel rows L1 through L8 are formed parallel to one another at the image-capturing element 212. The focus detection pixel rows L1 through L8 each form a focus detection pixel row Lp. The focus detection pixel row Lp is made up with a plurality of focus detection pixels 311 disposed along the horizontal direction. The plurality of focus detection pixels 311 forming a given focus detection pixel row Lp each receive a pair of focus detection light fluxes 73 and 74 passing through a pair of focus detection pupils 93 and 94, which are part of the exit pupil 90 of the interchangeable lens 202, set side-by-side along a direction parallel to the horizontal direction, in which the plurality of focus detection pixels 311 are disposed. The image-capturing element 212 repeatedly outputs, over a predetermined frame interval, a pair of image signals $A1_n$ and $A2_n$ corresponding to a pair of images formed with the pair of focus detection light fluxes 73 and 74 through photoelectric conversion at each focus detection pixel row Lp.

Each time pairs of image signals $A1_n$ and $A2_n$ are output via the individual focus detection pixel rows Lp after the predetermined frame interval, the body drive control device 214 generates spatially accumulated data B2(s, n, v) by adding the pair of image signals $A1_n$ and $A2_n$ output from the next focus detection pixel row or pairs of image signals $A1_n$ and $A2_n$ output from a plurality of focus detection pixel rows succeeding the focus detection pixel row L1 among the focus detection pixel rows L1 through L8, to the pair of image signals $A1_n$ and $A2_n$ output from the focus detection pixel row L1.

The body drive control device 214 generates temporally accumulated data B3(s, n, v) through temporal accumulation by adding up the spatially accumulated data B2(s, n, v) corresponding to the most recent frame through the frame preceding the most recent frame by v, each generated through calculation as the pairs of image signals $A1_n$ and $A2_n$ are output via the individual focus detection pixel rows Lp for the particular frame after the predetermined frame interval.

The body drive control device 214 detects the focusing condition at the interchangeable lens 202 based upon either the spatially accumulated data B2(s, n, v) or the temporally accumulated data B3(s, n, v).

In the digital still camera 201 configured as an image-capturing apparatus equipped with the focus detection device achieved in the first embodiment of the present invention as described above, precedence is given to spatial accumulation (cumulatively adding up the data from a plurality of focus detection pixels disposed close to one another) in the generation of focus detection data, and if valid focus detection data assuring reliability (indicating a maximum value, an average value or contrast value equal to or greater than a predetermined threshold value) cannot be obtained through the spatial accumulation alone, data are generated through temporal accumulation (by adding together the data from matching focus detection pixels output in correspondence to the current frame and past frames). As a result, problems attributable to temporal accumulation such as poor focus detection accuracy due to a change occurring over time in the subject image or movement of the subject, can be minimized and optimal autofocus adjustment is enabled even under low light or low contrast conditions.

(Second Embodiment)

In the first embodiment described above, focus detection pixel data are added together to calculate cumulative values with precedence given to spatial accumulation over temporal accumulation. The advantageous effect of the present invention is amply demonstrated in the second embodiment through spatial accumulation and temporal accumulation executed in an optimal combination in correspondence to an existing condition such as subject movement or shaky hand movement of the camera.

The second embodiment adopts a structure identical to that of the first embodiment and the flow of the overall operation executed therein is substantially the same as that executed in the first embodiment (see FIG. 8). The second embodiment is distinguishable in the processing executed for purposes of focus detection data generation. It is to be noted that the data stored in the internal memory 223 are updated so that the focus detection pixel data (output from the focus detection pixel rows L1 through L8) corresponding to the 10 frames, i.e., the most recent frame through the frame preceding the most recent frame by 10, are held in the internal memory 223.

Figure 15:
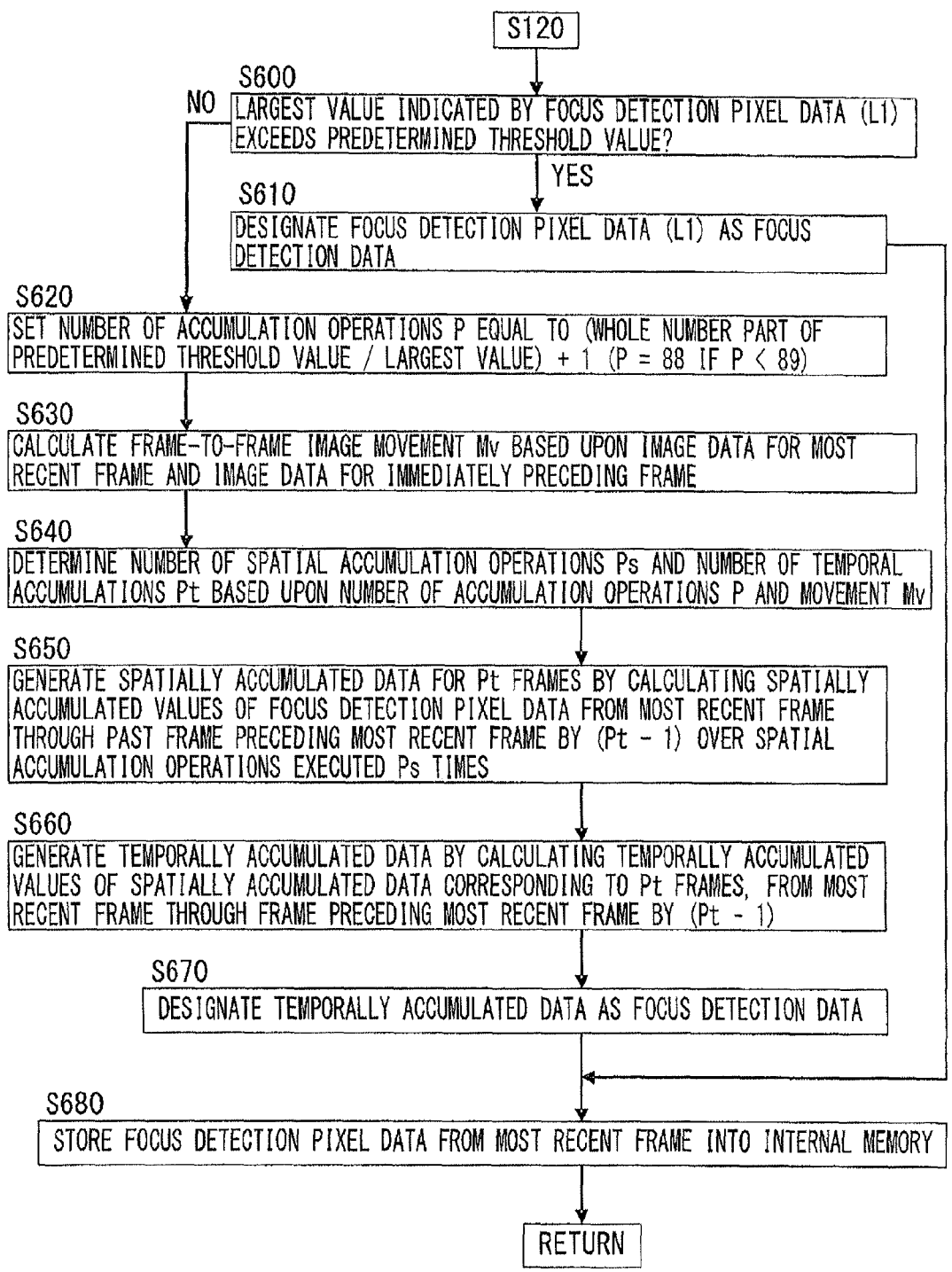

In reference to the processing flowchart presented in FIG. 15, the processing executed in the second embodiment in step S120 in FIG. 8 to generate focus detection data based upon focus detection pixel data will be described in detail.

In step S600, the CPU 222 in the body drive control device 214 checks the focus detection pixel data output from the focus detection pixels 311 disposed in the focus detection pixel row L1 in FIG. 3 so as to determine whether or not the largest value indicated by the focus detection pixel data exceeds a predetermined threshold value T1 (i.e., whether or not the condition expressed in (3) is satisfied).

If it is decided in step S600 that the condition expressed in (3) is satisfied, the processing proceeds to step S610, in which the CPU 222 in the body drive control device 214 designates the pixel data from the focus detection pixels disposed in the focus detection pixel row L1 as focus detection data as expressed in (4). The processing then proceeds to step S680.

If, on the other hand, it is decided in step S600 that the condition expressed in (3) is not satisfied, the processing proceeds to step S620, in which the CPU 222 in the body drive control device 214 calculates an overall number of accumulation operations P by adding 1 to the whole number part of the quotient of the predetermined threshold value T1 divided by the largest value Max(B(s, n, 1)) indicated by the focus detection pixel data.

In step S630, the CPU 222 in the body drive control device 214 determines a frame-to-frame motion vector through a method of the known art based upon the image data (the data output from the image-capturing pixels) for the most recent frame and the image data from the immediately preceding frame and calculates a frame-to-frame movement Mv by taking the absolute value of the motion vector. It is to be noted that the image data for the immediately preceding frame are held in the buffer memory or in the internal memory 223.

In step S640, the CPU 222 in the body drive control device 214 determines a number of spatial accumulation operations Ps and a number of temporal accumulation operations Pt based upon the number of accumulation operations P and the movement Mv. This processing will be described in detail later.

In step S650, the CPU 222 in the body drive control device 214 generates spatially accumulated data for Pt frames through spatial accumulation by adding together the focus detection pixel data (the focus detection pixel data output from the focus detection pixel rows L1 through L(Ps)) in the most recent frame through the frame preceding the most recent frame by (Pt−1) based upon the number of spatial accumulation operations Ps.

In step S660, the CPU 222 in the body drive control device 214 generates temporally accumulated data corresponding to the most recent frame through the frame preceding the most recent frame by (Pt−1) by adding up the spatially accumulated data for the Pt frames through temporal accumulation.

In step S670, the CPU 222 in the body drive control device 214 designates the temporally accumulated data as focus detection data. The processing then proceeds to step S680.

In step S680, the CPU 222 in the body drive control device 214 stores the focus detection pixel data corresponding to the most recent frame into the internal memory 223 in preparation for the focus detection operation processing to be executed for the next frame. The processing is then directed to proceed to step S130 in the flowchart presented in FIG. 8.

Figure 16:
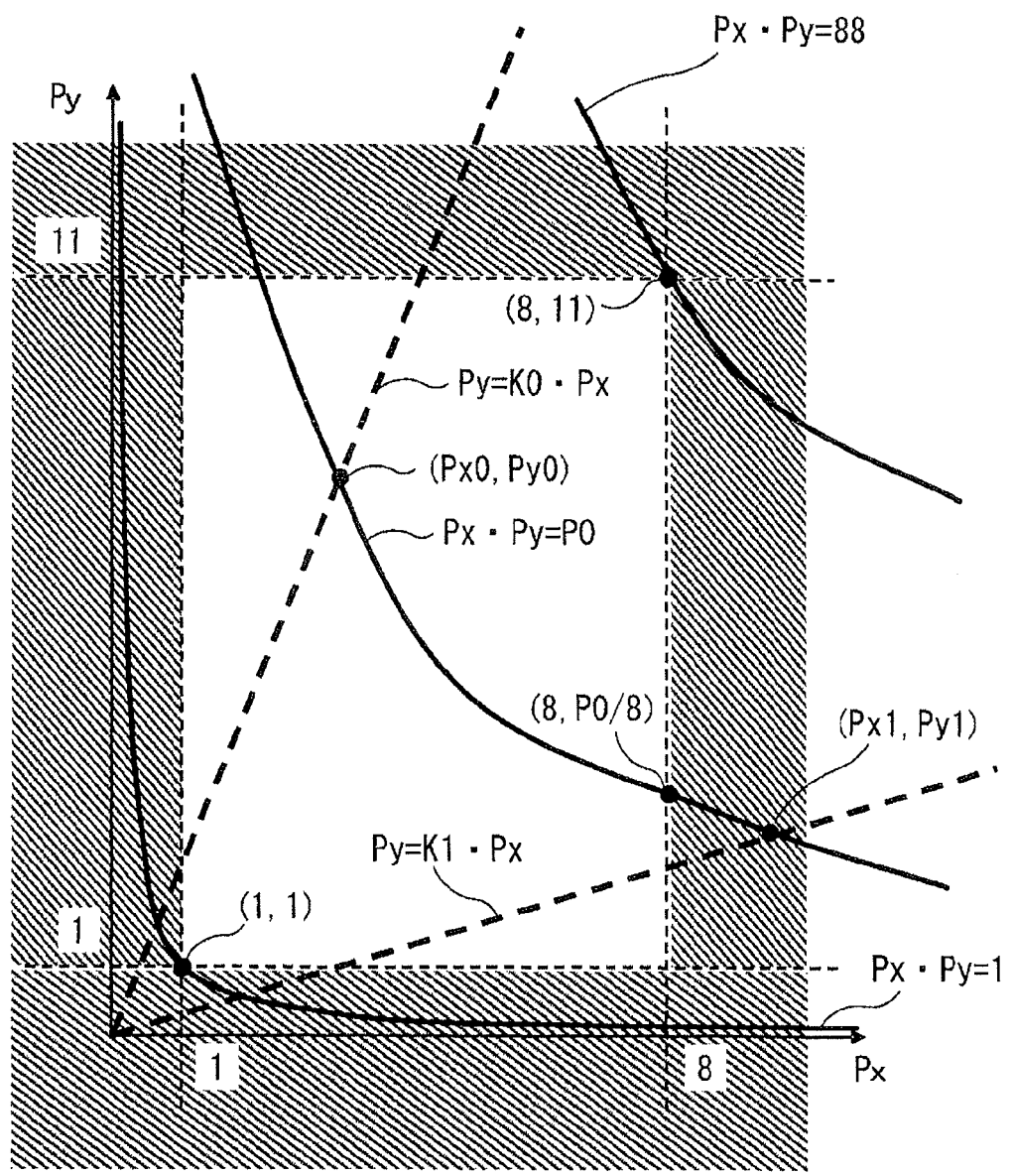

FIG. 16 presents a graph in reference to which the processing executed in step S640 in FIG. 15 to determine the number of spatial accumulation operations Ps and the number of temporal accumulation operations Pt will be explained in detail.

In FIG. 16, a variable Px representing the number of spatial accumulation operations is indicated along the horizontal axis, whereas a variable Py representing the number of temporal accumulation operations is indicated along the vertical axis. The range of the variable Px representing the number of spatial accumulation operations is limited so that $1 \leq Px \leq 8$, since there are eight focus detection pixel rows L1 through L8. In addition, since the data stored in the internal memory 223 are updated so that data over the past 10 frames are held therein at any given time, the temporal operation can only be executed up to 11 frames including the most recent frame, as far as the number of temporal accumulation operations Pt is concerned. In other words, the range for the variable Pt is limited to $1 \leq Pt \leq 11$. Accordingly, every conceivable combination of the number of spatial accumulation operations Px and the number of temporal accumulation operations Py must fall into the range (allowable range) in the shaded area in FIG. 16.

The product of the number of spatial accumulation operations Px and the number of temporal accumulation operations Py indicates the overall number of accumulation operations P. Namely, $P = Px \cdot Py$. The values taken for Px and Py, having a functional relation to each other, as described above, can be determined in correspondence to the value assumed for the number of accumulation operations P. FIG. 16 presents examples in which P=88, p=p0 and P=1 (1<P0<88).

A function $Py = K \cdot Px$ is determined based upon the movement Mv. The coefficient K in this function is equal to D/Mv, which is the ratio of the pitch D between the focus detection pixel rows (e.g., the distance measured along the vertical direction between the focus detection pixel row L1 and the next focus detection pixel row L2) to the movement Mv. Namely, when the movement Mv is large relative to the pitch D, the extent of image blur increases (the contrast is lowered) through temporal accumulation in excess of the increase in the extent of image blur (lowered contrast) attributable to spatial accumulation. Accordingly, the coefficient K takes a smaller value under such circumstances, so as to keep down the number of temporal accumulation operations Py.

When the movement Mv is small relative to the pitch D, on the other hand, the extent of image blur attributable to spatial accumulation increases (lowered contrast) in excess of the increase in the extent of image blur (lowered contrast) attributable to temporal accumulation. Under such circumstances, the coefficient K takes on a greater value so as to keep down the number of spatial accumulation operations Px. FIG. 16 shows two different forms of the function Py=K·Px, one with the coefficient K taking a large value (K=K0) and the other with the coefficient K taking a small value (K=K1).

For instance, in conjunction with the overall number of accumulation operations P0 and the coefficient K corresponding to the movement Mv taking the value K0, the intersecting point at which the function Px·Py=P0 and the function Py=K0·Px intersect each other is determined. Provided that the coordinates (Px0, Py0) of the intersecting point are within the allowable range, as indicated in FIG. 16, intersecting point coordinates (Pxs, Pyt) taking on integral values, which are closest to the intersecting point coordinates (Px0, Py0) within the allowable range, are determined, the number of spatial accumulation operations Ps is set to Pxs and the number of temporal accumulation operations Pt is set to Pxt.

When the overall number of accumulation operations is P0 and the coefficient K corresponding to the movement Mv is K1, on the other hand, the coordinates (Px1, Py1) of the intersecting point at which the function Px·Py=P0 and the function Py=K1·Px intersect each other are outside the allowable range. Under such circumstances, the coordinates are shifted from the intersecting point coordinates (Px1, Py1) along the function Px·Py=P0 until the coordinates are inside the allowable range ((8, P0/8) in the example presented in FIG. 16), intersecting point coordinates (Pxs, Pyt) taking integral values, which are the closest to (8, P0/8) within the allowable range are determined, and the number of spatial accumulation operations Ps is set to Pxs and the number of temporal accumulation operations Pt is set to Pyt.

The processing described above is summarized as follows. Namely, for the number of spatial accumulation operations and the number of temporal accumulation operations, the product of which sustains a constant value (P0), the value of the number of temporal accumulation operations and the value of the number of spatial accumulation operations are determined so that the coefficient K takes a value in reverse proportion to the movement. The constant value P0, i.e., the product of the number of spatial accumulation operations and the number of temporal accumulation operations, is set so that the evaluation value (the largest value, the average value, the contrast value or the like) indicating the data characteristics of the focus detection data exceeds the predetermined threshold value T1 used in the first embodiment. The number of spatial accumulation operations Px and the number of temporal accumulation operations Py are set so that the number of temporal accumulation operations Py never exceeds the number of spatial accumulation operations Px and that the product of the number of spatial accumulation operations Px and the number of temporal accumulation operations Py is substantially equal to the constant value P0.

While the coefficient K in FIG. 16 is defined as the ratio of the pitch D to the movement Mv, the coefficient K may be defined as the ratio (K=D/Mv1) of the pitch D to an average movement Mv1, i.e., an average value Mv1 of movements Mv over a plurality of frames. As a further alternative, the coefficient K may be defined as the ratio (K=D/Mv2) of the pitch D to vertical movement Mv2 of the motion vector. As another alternative, the coefficient K may be defined as the ratio (K=D/Mv3) of the pitch D to horizontal movement Mv3 of the motion vector.

In addition, as the direction of the motion vector becomes closer to the horizontal direction, the focus detection accuracy is affected by the temporal accumulation to a greater extent than the degree to which it is affected by the spatial accumulation. Accordingly, the coefficient K may be defined as the ratio (K=Mv2/Mv3) of the vertical movement Mv2 to the horizontal movement Mv3.

Furthermore, instead of detecting a frame-to-frame motion vector, the movement may be detected via a dedicated motion detection device installed specifically for purposes of motion detection. Such a dedicated motion detection device may be, for instance, an acceleration sensor installed in the body and in such a case, outputs from the acceleration sensor may be temporally integrated in correspondence to frame intervals so as to detect any movement of the camera (image blur) occurring within a single frame.

Moreover, the coefficient K does not need to be a value corresponding to movement and may instead be a value corresponding to a factor that affects the focus detection accuracy in relation to the temporal accumulation and the spatial accumulation. For instance, the horizontal high-frequency component in images is highly likely to decrease through temporal accumulation and such a decrease in the horizontal high-frequency component is bound to result in lowered focus detection accuracy. Accordingly, the horizontal high-frequency component in an image may be determined through image processing and the coefficient K mentioned above may be defined as a value that is in reverse proportion to the level of the high-frequency component.

In addition, when the defocus amount is significant, the high-frequency component in the image is bound to be smaller due to blurring and accordingly, the coefficient K may be defined as a value that is in proportion to the defocus amount determined through focus detection.

The number of spatial accumulation operations and the number of temporal accumulation operations optimal for focus detection can be selected in a flexible manner by adjusting the coefficient K in correspondence to other photographic factors bound to affect the focus detection accuracy, such as the lens drive speed, the aperture number set at the photographic lens, the brightness in the photographic field, the photographic mode selected for the camera (still subject photographing mode or moving subject photographing mode) or the like.

In the second embodiment of the present invention described above, focus detection data are generated by selecting optimal values for the number of spatial accumulation operations (the number of times the data from a plurality of focus detection pixels disposed in close proximity to one another are added up to calculate cumulative values) and the number of temporal accumulation operations (the number of times the data output from matching focus detection pixels for past frames are added up), with the combination of these values achieving an overall number of accumulation operations determined in correspondence to an evaluation value (e.g., the largest value, the average value or the contrast value) representing the data characteristics, based upon the extent of image movement or the like, so as to minimize image blur (lowered contrast) bound to result from spatial accumulation and temporal accumulation. As a result, the problem attributed to data accumulation (compromised focus detection accuracy due to lowered contrast) can be minimized, thereby assuring good autofocus adjustment even under low light or low contrast conditions.

While the image-capturing element 212 shown in FIG. 4 includes focus detection pixels 311 each having a pair of photoelectric conversion units, the present invention may instead be adopted in an image-capturing element that includes first focus detection pixels, each having one photoelectric conversion unit (one of the pair of photoelectric conversion units), and a second focus detection pixels, each having one photoelectric conversion unit (the other photoelectric conversion unit in the pair), disposed at alternate positions.

Figure 17:
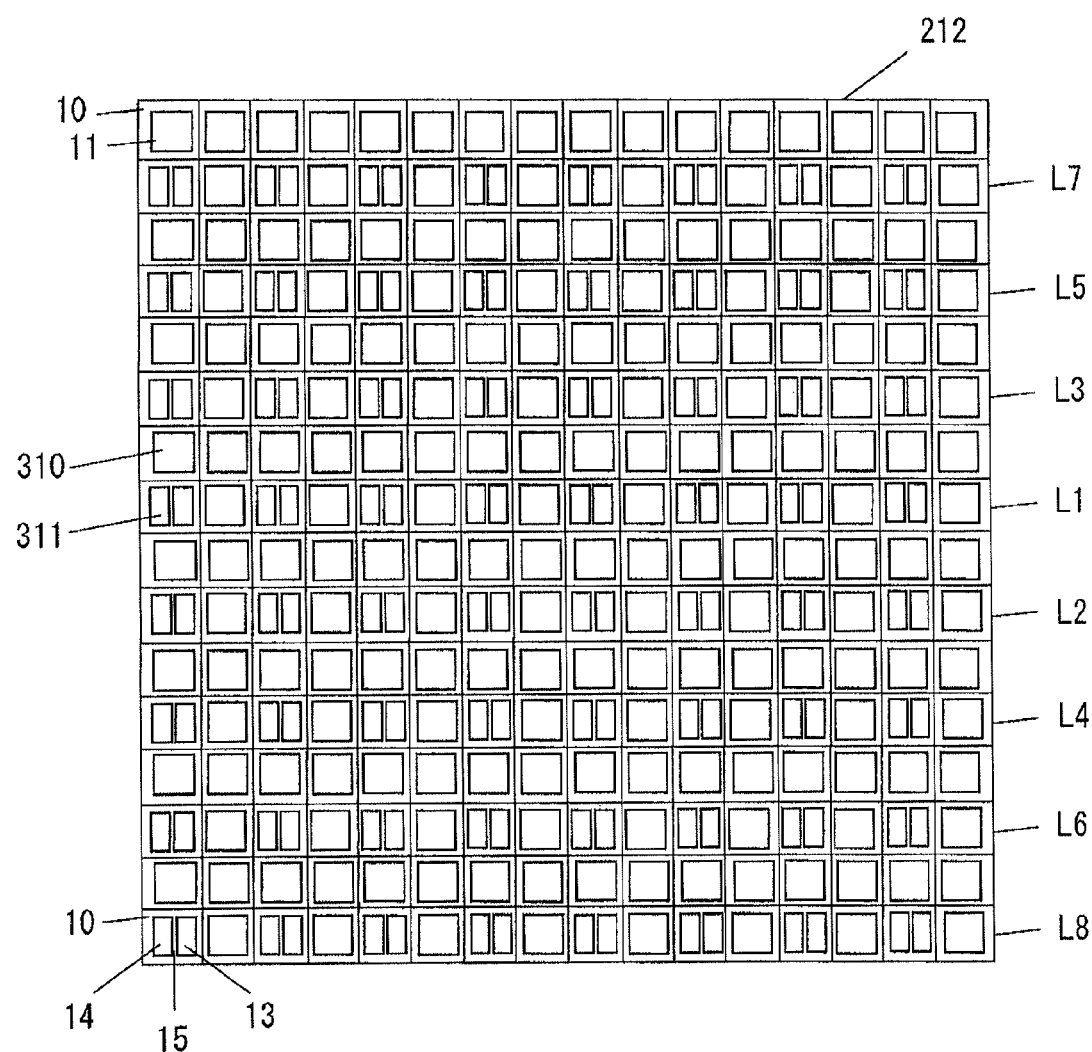

In the embodiments described above, the pixel data from the focus detection pixels 311 in a single focus detection pixel row or a plurality of focus detection pixel rows among the focus detection pixel row L2 through Lp are added, starting with the focus detection pixel row located closest to the focus detection pixel row L1, to the pixel data from the focus detection pixels 311 in the focus detection pixel row L1 at the image-capturing element 212 shown in FIG. 4 so as to calculate cumulative data values through spatial accumulation. At the image-capturing element 212 shown in FIG. 4, the focus detection pixel rows L2 through L8 are all located further downward relative to the focus detection pixel row L1. However, the present invention may be adopted in an image-capturing element 212 such as that shown in FIG. 17, with focus detection pixel rows L2, L4, L6 and L8 disposed further downward relative to the focus detection pixel row L1, the focus detection pixel row L2 located closest to the focus detection pixel row L1 and the focus detection pixel row L8 located furthest away from the focus detection pixel row L1, and with focus detection pixel rows L3, L5 and L7 disposed further upward relative to the focus detection pixel row L1, the focus detection pixel row L3 located closest to the focus detection pixel row L1 and the focus detection pixel row L7 located furthest away from the focus detection pixel row L1. In this case too, spatial accumulation operations should be executed by adding the pixel data from the focus detection pixel rows L2 through L8, starting with the focus detection pixel row located closest to the focus detection pixel row L1.

In the embodiments described above, the pixel data from the focus detection pixels 311 in a single focus detection pixel row or a plurality of focus detection pixel rows among the focus detection pixel row L2 through Lp are added, starting with the focus detection pixel row located closest to the focus detection pixel row L1, to the pixel data from the focus detection pixels 311 in the focus detection pixel row L1 at the image-capturing element 212 shown in FIG. 4 so as to calculate cumulative data values through spatial accumulation. Through this spatial accumulation, the data B1(s, n, p) indicating cumulative values each calculated by adding data output from the photoelectric conversion units belonging to a single type in focus detection pixels 311, taking up corresponding positions closest to each other along the vertical direction and sharing the same value for the variable n indicating the horizontal pixel position, are generated as expressed in (5).

As an alternative, spatial accumulation operations may be executed as expressed in (19) so as to add up data output from focus detection pixels disposed at positions, one shifted relative to the other by 1 along the horizontal direction with the variable n at the one incremented by 1 relative to the value taken for the variable n of the other, i.e., the data output from the photoelectric conversion units belonging to the same type in focus detection pixels 311 disposed closest to each other along a diagonal direction, as the distance between the focus detection pixel row L1 and the focus detection pixel row Lp, the data from which are to be added for spatial accumulation in a sequence corresponding to the proximity to the focus detection pixel row L1, increases, i.e., as the variable p takes on a greater value. In expression (19), s=1, 2, n=1~N and p=1~8.

$$B1(s,n,p)=B1(s,n,p-1)+B(s,n+p-1,p)$$

As a further alternative, spatial accumulation operations may be executed as expressed in (20) and (21) below by switching the data to be added up for spatial accumulation depending upon whether the focus detection pixel row Lp is an odd-numbered focus detection pixel row with the variable p taking an odd-numbered value or the focus detection pixel row Lp is an even-numbered focus detection pixel row with the variable p taking an even-numbered value, i.e., by shifting the horizontal position back and forth, indicated by the variable n, of the focus detection pixel, the data from which are to be added, by 1 depending upon whether the focus detection pixel row Lp is an odd-numbered focus detection pixel row or an even-numbered focus detection pixel row, so as to add together the data output from the photoelectric conversion units belonging to the same type in focus detection pixels 311 located closest to each other in a staggered pattern. In expression (20), p=1, 3, 5, 7 whereas in expression (20), P=2, 4, 6, 8. In addition, in expressions (20) and (21), s=1, 2 and n=1~N.

$$B1(s,n,p)=B1(s,n,p-1)+B(s,n,p) \tag{20}$$

$$B1(s,n,p)=B1(s,n,p-1)+B(s,n+1,p) \tag{21}$$

While the image-capturing element 212 achieved in the embodiments described above includes color filters disposed at the image-capturing pixels thereof in the Bayer array pattern, the structures of such color filters and the array pattern of the color filters are not limited to those in the embodiments. The present invention may be adopted in conjunction with an array of complementary color filters (green: G, yellow: Ye and magenta: Mg, cyan: Cy) or in conjunction with an arrangement other than the Bayer array.

While the image-capturing pixels and the focus detection pixels are disposed together on the image-capturing element achieved in the embodiments described above, the present invention may be adopted in a configuration that includes a mirror disposed in the optical path, via which light fluxes are separated to be directed to an image-capturing element constituted with image-capturing pixels alone and to a focus detection element (image sensor) constituted with focus detection pixels alone.

It is to be noted that an image-capturing apparatus is not limited to a digital camera, with an interchangeable lens mounted at the camera body, as described above. For instance, the present invention may instead be adopted in a digital camera with an integrated lens, a film still camera or in a video camera. Furthermore, it may also be adopted in a compact camera module built into a mobile telephone or the like, in a visual recognition device in a surveillance camera or a robotic optical system, in a vehicular onboard camera or the like.

REFERENCE SIGNS LIST 10 micro-lens
11, 13, 14 photoelectric conversion unit
15 element separation area
71 photographic light flux
73, 74 focus detection light flux
90 exit pupil
91 optical axis
93, 94 focus detection pupil
95 area
101 focus detection position
201 digital still camera
202 interchangeable lens
203 camera body
204 mount unit
206 lens drive control device
208 zooming lens
209 lens
210 focusing lens
211 aperture
212 image-capturing element
213 electrical contact point
214 body drive control device
215 liquid crystal display element drive circuit
216 liquid crystal display element
217 eyepiece lens
219 memory card
220 image-capturing element control unit
221 buffer memory 222 CPU
223 internal memory
310 image-capturing pixel
311 focus detection pixel

The invention claimed is:

1. A focus detection device, comprising:
an image sensor that includes a first number of focus detection units, each focus detection unit having a plurality of focus detection pixels disposed along a first direction, each focus detection pixel outputting a first signal and a second signal, and the first number of focus detection units arranged in a second direction that is different from the first direction; and
a processor that calculates a first addition value by adding together first signals output from the focus detection pixels arranged along the second direction in the first number of focus detection units and calculates a second addition value by adding together second signals output from the focus detection pixels arranged along the second direction in the first number of focus detection units, the processor detecting a focusing condition at an optical system based upon the first addition value and the second addition value, wherein:
until a first cumulative value based upon the first addition value and the second addition value exceeds a threshold value, the processor calculates the first addition value by adding together a second number of the first signals and calculates the second addition value by adding together the second number of the second signals, the second number being set so as not to exceed the first number.

2. An image-capturing apparatus, comprising:
a focus detection device according to claim 1; and
a drive control device that drives the optical system to a focus position based upon the focusing condition detected by the processor, wherein:
the processor obtains image data based upon a photographic light flux having originated from a subject and passed through the optical system when the optical system is set at the focus position.

3. The focus detection device according to claim 1, wherein
the processor further calculates temporally accumulated values based upon the first addition value and the second addition value;
the first number of focus detection units each repeatedly output the first signals and the second signals;
the processor repeatedly calculates the first addition value by adding together the first signals output from the first number of focus detection units and repeatedly calculates the second addition value by adding together the second signals output from the first number of focus detection units;
the processor calculates the temporally accumulated values by adding up a third number of first addition values and the third number of second addition values obtained as the processor repeatedly calculates the first addition value and the second addition values; and
the processor detects the focusing condition based upon one of the first addition value and the second addition value, and the temporally accumulated values calculated based upon the first addition value and the second addition value.

4. The focus detection device according to claim 3, wherein:
the focus detection units each repeatedly output the first signals and the second signals corresponding to a first image and a second image formed with a first focus detection light flux and a second focus detection light flux, generated through photoelectric conversion.

5. The focus detection device according to claim 4, wherein:
the plurality of focus detection pixels forming the focus detection units each receive the first and second focus detection light fluxes having passed through a first area and a second area that are part of an exit pupil of the optical system and are set side-by-side along a direction parallel to the first direction; and
the first number of focus detection units are disposed so as to extend parallel to one another.

6. The focus detection device according to claim 4, wherein:
the plurality of focus detection pixels each include a micro-lens through which the first and second focus detection light fluxes pass and a first photoelectric conversion unit and a second photoelectric conversion unit set side-by-side along the first direction, where the first and second focus detection light fluxes received thereat undergo photoelectric conversion; and
via the micro-lens, the first and second photoelectric conversion units and a first area and a second area through which the first and second focus detection light fluxes pass, set side-by-side along a direction parallel to the first direction as part of an exit pupil of the optical system, achieve a conjugate relation to each other.

7. The focus detection device according to claim 6, wherein:
a plurality of image-capturing pixels that output subject image signals corresponding to a subject image generated through photoelectric conversion of a photographic light flux, having originated from a subject, passed through the optical system and received thereat, are disposed at the image sensor in combination with the plurality of focus detection pixels.

8. The focus detection device according to claim 4, wherein:
the second number and the third number are determined so that an evaluation value calculated based upon the first signals and the second signals exceeds the threshold value in a case where the processor detects the focusing condition based upon the temporally accumulated values.

9. The focus detection device according to claim 8, wherein:
the processor further detects an extent of movement occurring frame to frame in images formed on the image senor; and
in a case where the processor detects the focusing condition based upon the temporally accumulated values, the second number and the third number are determined so that a value taken for the third number becomes smaller relative to a value taken for the second number as the extent of movement increases and that a product of the second number and the third number is substantially equal to a constant value corresponding to the evaluation value and the threshold value.

10. The focus detection device according to claim 9, wherein:
the evaluation value corresponds to one of an average value of values indicated by the first signals and the second signals, a largest value indicated by the first signals and the second signals and a difference between the largest value and a smallest value indicated by the first signals and the second signals.

11. The focus detection device according to claim 8, wherein:
in a case where the processor detects the focusing condition based upon the first addition value and the second addition value, the evaluation value is the first cumulative value determined based upon the first addition value and the second addition value, with the second number set within a range not exceeding the first number and the third number set to 0 so that the first cumulative value exceeds the threshold value; and
wherein in a case where the processor detects the focusing condition based upon the temporally accumulated values, the evaluation value is a second cumulative value determined based upon the temporally accumulated values, with the second number set to the first number and the third number set so that the second cumulative value exceeds the threshold value.

12. The focus detection device according to claim 11, further comprising:
a storage device in which the first signals and second signals repeatedly output by each of the focus detection units are stored, wherein:
the processor calculates the first addition value and the second addition value by adding together the first signals and adding together the second signals stored in the storage device.

13. The focus detection device according to claim 11, further comprising:
a storage device in which the first addition values and the second addition values repeatedly calculated by the processor based on the first signals and the second signals output by each of the focus detection units are stored, wherein:
the processor calculates the temporally accumulated values by adding up the third number of the first addition values and the third number of the second addition values stored in the storage device.

14. The focus detection device according to claim 11, further comprising:
a storage device in which the temporally accumulated values calculated by the processor are stored, wherein:
for detecting the focusing condition based upon the temporally accumulated values, the processor detects the focusing condition based upon the temporally accumulated values stored in the storage device.

15. The focus detection device according to claim 11, wherein:
the first cumulative value and the second cumulative value correspond to an average value of the first addition values and the second addition values and an average value of the temporally accumulated values, a largest value of the first addition values and the second addition values and a largest value of the temporally accumulated values, or a difference between the largest value and the smallest value of the first addition values and the second addition values and a difference between the largest value and the smallest value of the temporally accumulated values.

* * * * *